United States Patent [19]

Lyke et al.

[11] Patent Number: 5,040,227
[45] Date of Patent: Aug. 13, 1991

[54] IMAGE BALANCING SYSTEM AND METHOD

[75] Inventors: David G. Lyke; Mark Ominsky, both of Charlotte, N.C.

[73] Assignee: International Business Machines Corporation, Armonk, N.Y.

[21] Appl. No.: 492,461

[22] Filed: Mar. 12, 1990

[51] Int. Cl.⁵ .......................... G06K 9/00; G06K 9/03
[52] U.S. Cl. ........................................ 382/7; 382/57; 235/379
[58] Field of Search ................. 382/7, 57, 1; 235/379; 340/726

[56] References Cited

U.S. PATENT DOCUMENTS

| | | | |
|---|---|---|---|
| 4,264,808 | 4/1981 | Owens et al. | 382/7 |
| 4,385,285 | 5/1983 | Horst et al. | 382/7 |
| 4,510,615 | 4/1985 | Rohrer | 382/7 |
| 4,523,330 | 6/1985 | Cain | 382/48 |
| 4,580,040 | 4/1986 | Granzow et al. | 235/379 |
| 4,617,457 | 10/1986 | Granzow et al. | 235/379 |
| 4,813,077 | 3/1989 | Woods et al. | 235/379 |
| 4,873,514 | 10/1989 | Nakagawa et al. | 340/726 |

FOREIGN PATENT DOCUMENTS

PCT/US87/-
02362  3/1988  World Int. Prop. O.

OTHER PUBLICATIONS

IBM 3895, Docket Reader/Inscriber Machine and Programming Description, GA24-3620-0, File No. S370-04.

Electronic Payment Systems Support/Deposit Processing-OS/VS General Information Manual, GH20-1971-1, Program Number 5740-F13, Second Edition, Jul. 1977.

IBM 3895, Deposit Processing System, Concepts and Facilities, First Edition, Dec. 1978.

Primary Examiner—Leo H. Boudreau
Assistant Examiner—Steven P. Fallon
Attorney, Agent, or Firm—Bell, Seltzer, Park & Gibson

[57] ABSTRACT

The system and method of this invention provides for fast and accurate detection and correction of errors in a document processing operation in which the total of the amounts for a series of transaction documents must be balanced to match the total amount shown on an associated depositor summary document. The errors may be depositor errors or system errors. An image of the depositor summary document, e.g. adding machine tape or customer deposit slip, is displayed on a screen. The display includes images of the amount of each transaction document (check) as listed by the depositor. A second display containing coded data amounts which are associated with the individual transaction documents is also displayed on the same screen, permitting an operator to compare the transaction amount images to the corresponding coded data amounts for the transaction documents. The operator identifies a discrepancy between the first display and the second display, and takes appropriate corrective action.

37 Claims, 33 Drawing Sheets

FIG. 6A.

| Deposit Modify View Enhance Options Help |
|---|

Balancing-Proof 139 44

Credit = 139.44
Adjust =
Debit = 181.54 — 152
Diff = -42.10 — 149
       — 150

148
146

Deposit Detail
43 59
22 33
53 52

140

Coded Items
63 59
22 33
42 10
53 52

142

[Ok] [Suspend] [Next Error] [Full Credit] [Add-Err]

[Help]

Balancing-Proof
Deposit  Modify  View  Enhance  Options  Help

13944

Credit   =  13944
Adjust   =
Debit    =  181.54
Diff     =  -42.10

Error Type:
○ Processing Error
● Enclosed / Not Listed
○ Addition Error
○ Not Enclosed / Listed as:
○ Listed incorrectly as:
○ Other Adjust Code:
3
14
22
15
16

Coded Items
6359

Depositor: AJ Bayless

Deposit Detail
4359
2233
5352

Charles Bromer
A.J. Bayless

THE BANK OF YUG CITY
YUG CITY USA 12345
MARCH 13 1990

0000000029

113000609   12345716   $210
Routing-Transit  Account  PC Field  Amount

140

Suspend  Next Error  Full Credit  Add-Err  Re-Select  Full  Flip  Find  Remove  Help
Ok

FIG.6D.

Balancing-Proof

Deposit  Modify  View  Enhance  Options  Help 139 44

146

Credit  =  139.44
Adjust  =  42.10
Debit   =  1B1.54
Diff    =  0.00

148

Coded Items
— 63 59
— 22 33
42 10 ADJ
— 53 52

142

Deposit Detail
63 59
22 33
53 52

140

Ok  Suspend  Next Error  Full Credit  Add-Err  Help

| Deposit Modify View Enhance Options Help | Balancing-Proof | |
|---|---|---|

59133 ⊘  — 146

Credit  = [5913.30] — 148, 152
Adjust — 149
Debit  = 5914.90 — 150
Diff   = -1.60

Tape Detail | Coded Items
--- | ---
5.90+ | 5.90
240.80+ | 240.80
100.80+ | 100.00
360.48+ | 360.40
34.47+ | 34.47
30.43+ | 30.43
53.25+ | 53.25
80.00+ | 80.00
3.24+ | 3.24
206.78+ | 206.78
28.46+ | 28.46 PAB
39.31+ | 39.31
18.00+ | 18.00
39.04+ | 39.04
193.57+ | 193.57
125.00+ | 125.00
57.11+ | 57.11
65.00+ | 65.00
41.52+ | 41.52
972.19+ | 972.19

140
142
143
144 — 145

BE9  5913.30T

Credit  = 5913.30
Adjust
Debit  = 5914.90
Diff   = -1.60

[Detail]

160

[Ok] [Suspend] [Next Error] [Full Credit] [Add-Err] [Help]

| Deposit | Modify | View | Enhance | Options | Help |

Balancing-Proof

*5913.30*

```
Credit   =  5913.30   ←152
Adjust   =            ←149
Debit    =  5914.90   ←150
Diff     =    -1.60
```
146 148

BE 9  5913.30T

```
Credit   =  5913.30
Adjust   =
Debit    =  5914.90
Diff     =    -1.60
```
160

[Detail]

| Tape Detail | Coded Items |
|---|---|
| 206.78+ | 206.78 |
| 28.46+ | 28.46 PAB |
| 39.31+ | 39.31 |
| 18.00+ | 18.00 |
| 39.04+ | 39.04 |
| 193.57+ | 193.57 |
| 125.00+ | 125.00 |
| 57.11+ | 57.11 |
| 65.00+ | 65.00 |
| 41.52+ | 41.52 |
| 972.19+ | 972.19 |
| 2.02+ | 3.02 |
| 104.62+ | 104.62 |
| 16.15+ | 16.15 |
| 20.00+ | 20.00 |
| 30.00+ | 30.00 |
| 245.48+ | 245.48 |
| 2310.49+ | 2310.49 |
| 20.00+ | 20.50 PAB |

140    142

[Ok] [Suspend] [Next Error] [Full Credit] [Add-Err]

| Deposit | Modify | View | Enhance | Options | Help | Balancing-Proof |

*5913 30*

146

Credit  =  5913.30
Adjust  =
Debit   =  5914.30
Diff    =  -1.00

160

BE9   5913.30T

Credit  =  5913.30
Adjust  =
Debit   =  5914.30
Diff    =  -1.00

[Detail]

| Tape Detail | | Coded Items | |
|---|---|---|---|
| 206.78+ | | 206.78 | |
| 28.46+ | | 28.46 PAB | |
| 39.31+ | | 39.31 | |
| 18.00+ | | 18.00 | |
| 39.04+ | | 39.04 | |
| 193.57+ | | 193.57 | |
| 125.00+ | | 125.00 | |
| 57.11+ | | 57.11 | |
| 65.00+ | | 65.00 | |
| 41.52+ | | 41.52 | |
| 972.19+ | | 972.19 | |
| 2.02+ | | 3.02 | |
| 104.62+ | | 104.62 | |
| 16.15+ | | 16.15 | |
| 20.00+ | | 20.00 | |
| 30.00+ | | 30.00 | |
| 245.48+ | | 245.48 | |
| 2310.49+ | | 2310.49 | |
| 20.00+ | | 20.00 ннC | |

140    142

[Ok] [Suspend] [Next Error] [Full Credit] [Add-Err]

[Help]

FIG.7F.

| Deposit | Modify | View | Enhance | Options | Help |

Balancing-Proof

Credit = 59133 D
Adjust = 5913.30
Debit = 5914.30
Diff = -1.00

Error Type:  Adjust Code:
● Processing Error  _3_
○ Enclosed / Not Listed  14
○ Addition Error  22
○ Not Enclosed / Listed as:  15
○ Listed incorrectly as:  16
○ Other Depositor: Michigan Bank - Livingston BEQ 591  [Detail]

Tape Detail
206.78+
28.46+
39.31+
18.00+
39.04+
193.57+
125.00+
57.11+
65.00+
41.52+
972.19+
2.02+
104.62+
16.15+
20.00+
30.00+
245.48+
2310.49+
20.00+

140

Coded Items
206.78
28.46 PAB
39.31
18.00
39.04
193.57
125.00
57.11
65.00
41.52
972.19
3.02
104.62
16.15
20.00
30.00
245.48
2310.49
20.00 ***C

142

$3.02
3.02 — 162
155

[Ok] [Suspend] [Next Error] [Add-Err] [Full Credit] [Re-Select] [Full] [Flip] [Find] [Remove] [Help]

| Deposit Modify View Enhance Options Help | Balancing-Proof | |
|---|---|---|
| | | 146 |
| | | 5913.30 |
| | Credit = | 1.00 |
| | Adjust = | 5914.30 |
| | Debit = | 0.00 |
| | Diff = | |

59133 ⊘

Tape Detail
206.78+
28.46+
39.31+
18.00+
39.04+
193.57+
125.00+
57.11+
65.00+
41.52−
972.19+
2.02+ — 140
104.62+
16.15+
20.00+
30.00+
245.48+
2310.49+
20.00+

Coded Items — 142
206.78
28.46 PAB
39.31
18.00
39.04
193.57
125.00
57.11
65.00
41.52
972.19
3.02 ADJ
104.62
16.15
20.00
30.00
245.48
2310.49
20.00 ∞C

BE9   5913.30T     — 160

| Credit = | 5913.30 |
|---|---|
| Adjust = | 1.00 |
| Debit = | 5914.30 |
| Diff = | 0.00 |

[Detail]

[Ok] [Suspend] [Next Error] [Full Credit] [Add-Err]     [Help]

FIG.8A.

| Deposit | Modify | View | Enhance | Options | Help |

Balancing-Proof 685.47

*685 47*

| | Credit | = | 685.47 |
|---|---|---|---|
| | Adjust | | |
| | Debit | = | 665.47 |
| | Diff | = | 20.00 |

Tape Detail
12.06+
97.25+
40.00+
20.00+
29.94+
13.53+
425.34+
47.35+

Coded Items
12.06
97.25
40.00
MISSING
29.94
13.53
425.34
47.35

B5G  685.47T

| | Credit | = | 685.47 |
|---|---|---|---|
| | Adjust | | |
| | Debit | = | 665.47 |
| | Diff | = | 20.00 |

[Detail]

[Ok] [Suspend] [Next Error] [Full Credit] [Add-Err] [Help]

Balancing-Proof
Deposit  Modify  View  Enhance  Options  Help 685 47

Credit   =   685.47
Adjust
Debit   =   685.47
Diff    =     0.00

Tape Detail
  12.06+
  97.25+
  40.00+
  20.00+
  29.94+
  13.53+
 425.34+
  47.35+

Coded Items
  12.06
  97.25
  40.00
  20.00 ++C
  29.94
  13.53
 425.34
  47.35

B5G    685.47 T

Credit   =   685.47
Adjust
Debit   =   685.47
Diff    =     0.00

[Detail]

[OK]  [Suspend]  [Next Error]  [Full Credit]  [Add-Err]    [Help]

FIG. 9A.

Balancing-Proof

Deposit  Modify  View  Enhance  Options  Help

12002

Credit  = 120.02
Adjust =
Debit  = 37.22
Diff   = 82.80

Deposit Detail
82 80
10 22
27 00

Coded Items
MISSING
____ 10 22 PAB
____ 27 00

[OK] [Suspend] [Next Error] [Full Credit] [Add-Err]

[Help]

FIG.9B

Balancing-Proof
Deposit Modify View Enhance Options Help

12002

Credit = 120.02
Adjust =
Debit = 37.22
Diff = 82.80

Error Type:
Processing Error
○ Enclosed / Not Listed
○ Addition Error
Not Enclosed / Listed as:
○ Listed incorrectly as:
○ Other Adjust Code:
 3
 14
 22
 15
 16

82.80

Coded Items
OPAB

Deposit Detail
8280
1022
2700

Depositor: K Mart

No Matching Items Found 113000609    12345716    0.00
Routing-Transit    Account    PC Field    Amount

[Ok] [Suspend] [Next Error] [Full Credit] [Add-Err] [Re-Select] [Full] [Flip] [Find] [Remove] [Help]

| Deposit | Modify | View | Enhance | Options | Help |

Balancing-Proof 26601 31

Credit = 26601.21
Adjust =
Debit = 26636.18
Diff = -34.97

Tape1 Detail

| 10.28+ |
| 17.30+ |
| 711.00+ |
| 28.90+ |
| 27.00+ |
| 16.60+ |
| 3.00+ |
| 5.14+ |
| 1.23+ |
| 201.69+ |
| 183.86+ |
| 281.77+ |
| 4.00+ |
| 17.93+ |
| 45.00+ |
| 212.48+ |
| 9.46+ |
| 40.00+ |
| 8.00+ |
| 15.00+ |

Coded Items

| 17.30 |
| 711.00 |
| 28.90 |
| 27.00 |
| 16.60 |
| 3.00 |
| 5.14 |
| 1.23 |
| 201.69 |
| 183.86 |
| 34.97 PAB |
| 281.77 |
| 4.00 |
| 17.93 |
| 45.00 |
| 212.48 |
| 9.46 |
| 40.00 |
| 8.00 |
| 15.00 |

ED7  6194.33 T
Credit = 6194.33
Adjust =
Debit = 6229.30
Diff = -34.97
[Detail]

ED9  12632.55 T
Credit = 12632.55
Adjust =
Debit = 12632.55
Diff = 0.00
[Detail]

EDB  7774.33 T
Credit = 7774.33
Adjust =
Debit = 7774.33
Diff = 0.00
[Detail]

[Ok] [Suspend] [Next Error] [Full Credit] [Add-Err] [Help]

| Balancing-Proof |
|---|
| Deposit  Modify  View  Enhance  Options  Help |

26601 21

Credit = 26601.21
Adjust =
Debit = 26601.21
Diff = 0.00

| Tape1 Detail | Coded Items |
|---|---|
| 17.30+ | 17.30 |
| 711.00+ | 711.00 |
| 28.90+ | 28.90 |
| 27.00+ | 27.00 |
| 16.60+ | 16.60 |
| 3.00+ | 3.00 |
| 5.14+ | 5.14 |
| 1.23+ | 1.23 |
| 201.69+ | 201.69 |
| 183.86+ | 183.86 |
| 281.77+ | 281.77 |
| 4.00+ | 4.00 |
| 17.93+ | 17.93 |
| 45.00+ | 45.00 |
| 212.48+ | 212.48 |
| 9.46+ | 9.45 |
| 40.00+ | 40.00 |
| 8.00+ | 8.00 |
| 15.00+ | 15.00 |
| 8.69+ | 8.69 |

ED7   6194.33T
Credit = 6194.33
Adjust =
Debit = 6194.33
Diff = 0.00
[Detail]

ED9   12632.55T
Credit = 12632.55
Adjust =
Debit = 12632.55
Diff = 0.00
[Detail]

ED8   7774.33T
Credit = 7774.33
Adjust =
Debit = 7774.33
Diff = 0.00
[Detail]

[OK] [Suspend] [Next Error] [Full Credit] [Add-Err] [Help]

IMAGE BALANCING SYSTEM AND METHOD

FIELD OF THE INVENTION

This invention generally relates to a computerized balancing process and system which is useful for example in proofing of customer deposits in a banking environment.

BACKGROUND OF THE INVENTION

In the processing of customer deposits by a bank, a balancing or reconciliation operation is performed to verify that the total deposit amount submitted by the depositor is the actual amount received by the bank. In banking terms, the balancing process "proves" that the credits (the total of the items in the deposit as determined by the depositor) are equal to the debits (the deposit total as determined by the bank).

Errors which the balancing process detects and corrects include depositor errors and system errors. Depositor errors include, for example, those where the amounts deposited are added incorrectly, a check is listed erroneously, a check included in the deposit but is not listed on the deposit slip, or, a check which is listed on the deposit slip is not enclosed. System errors include those where the system has incorrectly read an amount, an operator has incorrectly keyed an amount, checks are stuck together such that one is not read by the system, or where a check is missing from one deposit and included in another.

This balancing process has been conventionally carried out in a manual or semi-automated manner by balancing clerks with the assistance of business machines or computers. For example, the clerk may use a business machine to tally individual check amounts and balance to the total deposit amount as the operator is manually keying and encoding the amounts from the checks. Another balancing procedure, employed in the IBM 3895 system, utilizes a computer terminal to assist in the balancing operation. Checks and associated deposit slips are encoded with the corresponding amount and read into a computer. These documents are sorted and placed in various pockets of document trays for processing. The clerk, while sitting at a computer terminal, brings up lines of data on the screen relating to the document data stored in memory. If a balancing discrepancy occurs, the clerk then searches through the individual documents located in a pocket of a tray to locate the particular document in question, removes the document from the tray, enters the corrected amount from the check into the computer replacing the incorrect amount on the screen, and reinserts the document into its proper location in the document tray. Through this process, the balancing clerk is able to determine the cause of each out-of-balance condition and can correct the discrepancy via the computer terminal to achieve a balance state for each deposit until all out-of-balance conditions have been reconciled.

With the development of image processing technology and computers capable of handling image data as well as numerical data, it has been proposed by others that the images of documents be used during various document processing operations rather than the actual documents themselves in order to reduce the need for physically handling large numbers of documents. For example, Burns et al. U.S. Pat. No. 4,205,780 describes a document processing system wherein the images of documents are presented to an operator, who reads the document image and key enters the appropriate amount. Burns et al. suggest that the image processing system may be used for various purposes including initial encoding, capture and balancing of batches of checks. However, no method or apparatus disclosed by which balancing of deposits would be achieved. Owens et al. U.S. Pat. No. 4,264,808 also discloses a document processing system wherein electronic images of the documents are captured and used during various document processing steps in lieu of the actual physical documents. However, according to the Owens et al. disclosure, the balancing operation relies upon printed reports and the associated physical documents.

U.S. Pat. No. 4,813,077 to Woods et al. provides a system and method for processing of sales transaction records which includes a form of image balancing. The Woods et al. image balancing routine provides simultaneous display of an image taken from a transaction document and the amount attributed to that image as internally stored in the record for the document associated with that image. Adjustments can be made by the operator to correct inaccuracies. However, a very significant limitation of the Woods et al. balancing procedure is that it can only correct for system errors, such as those arising from the incorrect coding of the amount of a document. The balancing procedure does not address how to deal with other types of errors, such as depositor errors, as may occur for example due to an addition error in the deposit total or a discrepancy between the items listed on a deposit slip and the items actually included with a deposit.

SUMMARY OF THE INVENTION

The present invention overcomes the above discussed as well as other disadvantages of the prior art and provides an improved and enhanced method and apparatus for proofing of deposits, which is useful in a banking environment as well as in other applications. This is accomplished by providing for on-screen comparison of the depositor record, i.e. the amounts as listed by the depositor on the depositor summary document (e.g. deposit slip) with the bank record, i.e. the bank's record of the amounts of the individual transaction documents (checks) included in the deposit.

The present invention provides a method and system for fast and accurate detection and correction of errors in a document processing operation in which the total of a series of transaction documents must be balanced to match the total shown on an associated depositor summary document. The present invention is described more fully in the detailed description which follows and in the accompanying drawings as applied to a banking environment, wherein the summary documents processed include customer deposits and the individual transaction documents associated with a particular summary document include checks. However, it will be recognized that the principles and features of the present invention are not restricted to banking applications, but have broader applicability to various other applications involving the processing and balancing of individual transaction documents and associated summary documents.

The present invention provides a combination of method and system features which allows a balancing clerk or operator to efficiently find and correct various errors in deposits which are out-of-balance. Moreover, the system assists the operator in identifying discrepancies and deciding how to resolve them, rather than relying entirely on the operator as in prior conventional balancing procedures. By increasing the efficiency and productivity of the operator, there is a significant reduction in the personnel required to accomplish the balancing task. There also are reductions in the level of skill required on the part of the operators and the amount of training. The cost of the balancing operation is thus reduced.

An image of the depositor summary document, e.g. an adding machine tape or a customer deposit slip, is displayed in one area of a terminal screen. The display includes images of the amount of each transaction document (check) as listed by the depositor. In a second display area of the same terminal screen there is shown the bank's record for each transaction document, i.e. the coded data amounts which are associated with the individual transaction documents. The second display area is aligned alongside the first display area, permitting an operator to compare the depositors listing of the transaction amounts to the corresponding coded data amounts for the transaction documents according to the bank's records. When the operator identifies a discrepancy between the first display and the second display, the operator makes an indication that an inaccuracy exists. In the preferred embodiment, this indication is made by using a pointing device such as a mouse.

The discrepancy can be due either to a system error or to a depositor error. The depositor error can be one of several types: For example, the depositor may incorrectly add the individual transaction amounts located on the depositor summary document. An amount may be listed incorrectly on the depositor summary document. In such event, an adjustment must be made. A third type of depositor error is one in which an amount is listed on the depositor summary document but the corresponding transaction document is not enclosed. Still another type of depositor error occurs when an individual transaction document is enclosed with the depositor summary document but no corresponding entry appears on the depositor summary document. In the case of a depositor error, an adjustment is made to the depositor's account to resolve the error.

System or non-depositor errors also occur. In reality, these non-depositor errors occur more frequently than depositor errors. One such system error arises if the summary document total or the individual transaction document amount is incorrectly coded. This may occur due to inaccurate recognition of the amount by an optical character recognition (RECO) system, or due to incorrect keying by an operator. Another type of system error arises where two checks stick together ("piggy-backing") such that one is not read by the system. As a result, the amount of this check is not captured by the system. Finally, an individual transaction document may be included in a group of transaction documents associated with the wrong depositor summary document. In other words, a check may be missing from one deposit and included in another.

The present invention provides a hierarchy of operations designed to assist an operator in rapidly identifying errors and correcting an out-of-balance condition in a deposit.

Thus, one aspect of the present invention is the provision of method of processing documents in groups which include a depositor summary document, such as a customer deposit slip, and a plurality of associated transaction documents, such as checks, with each transaction document having an amount recorded thereon from which a coded data amount is derived, and with the depositor summary document containing a listing of the respective transaction amounts. The method comprises the steps of:

generating on a display screen a first display containing images of the respective transaction amounts listed on a depositor summary document;

also generating on the display screen a second display containing coded data amounts associated with each individual transaction document so that an operator may compare the transaction amount images in the first display with the corresponding transaction coded data amounts in the second display to identify a discrepancy; and responding to an operator indication of an identified discrepancy.

Another aspect of the present invention is the provision of method of processing documents of the type noted above, and including the steps of:

generating on a display screen a first display containing images of a series of amounts corresponding to individual transactions;

also generating on the display screen a second display containing coded data amounts associated with each individual transaction; and scrolling the respective displays to position the image of an individual transaction amount in the first display in close proximity to the corresponding coded data amount in the second display to thereby facilitate locating a discrepancy.

The present invention, in another aspect, provides a system for processing documents in groups, as noted above, including:

a display screen;

means for generating on the display screen a first display containing images of the respective transaction amounts listed on a depositor summary document; and means for also generating on the display screen in proximity to the first display a second display containing coded data amounts associated with each individual transaction document so that an operator may compare the transaction amount images in the first display to the corresponding transaction coded data amounts in the second display to identify a discrepancy.

Additional features and aspects of the invention will be evident from the detailed description and examples which follow, and from the accompanying drawings.

BRIEF DESCRIPTION OF THE DRAWINGS

A preferred form of the invention is illustrated in the accompanying drawings in which:

FIGS. 3A to 3F are flowcharts of the overall processing operations in accordance with the present invention;

FIGS. 6 to 10 illustrate examples of various display screens which are presented to an operator in the course of the image balancing procedure of the invention.

DESCRIPTION OF THE ILLUSTRATED EMBODIMENT

Hardware Environment

Figure 1:
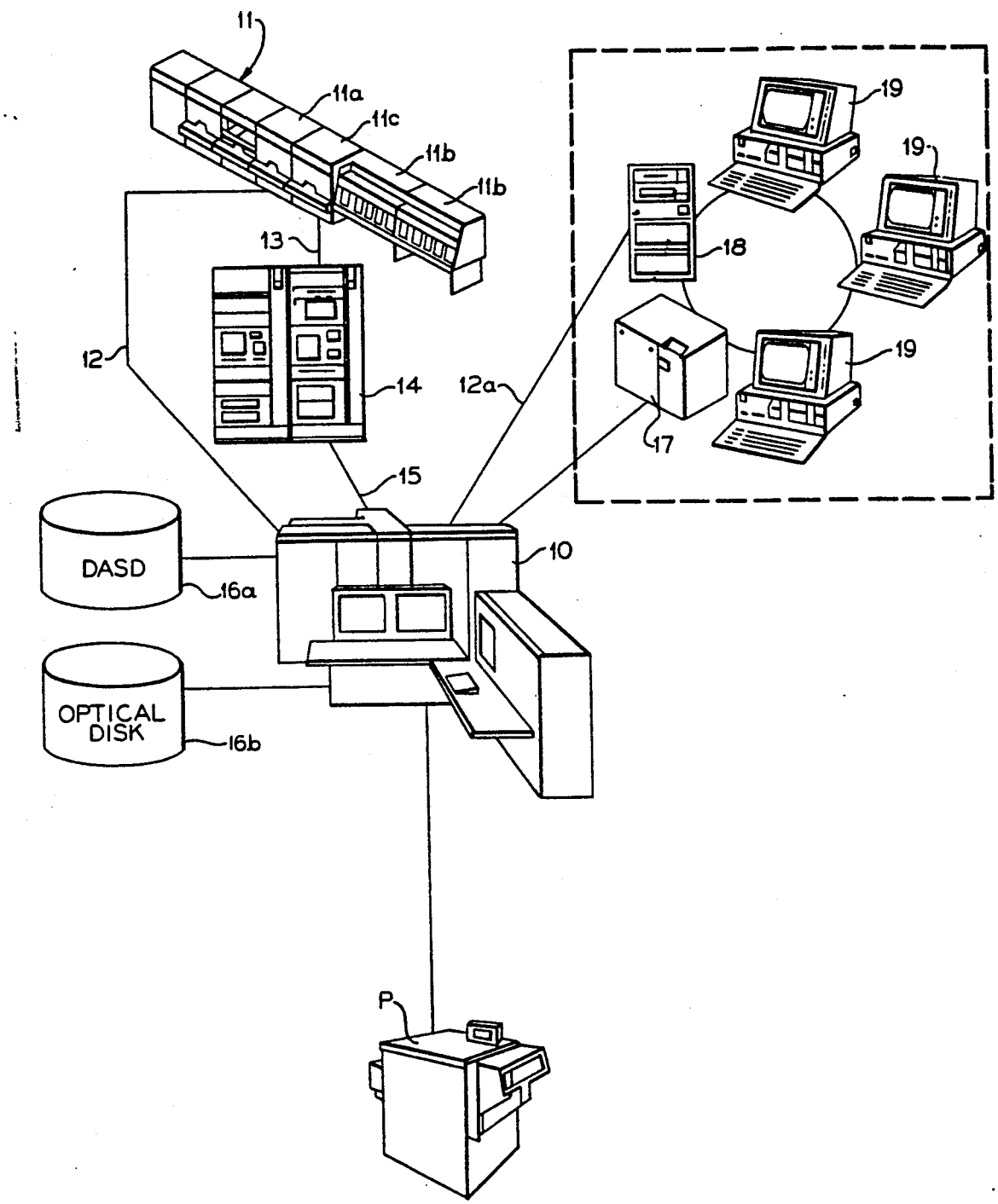
FIG. 1 is a diagrammatic view showing a suitable computer hardware environment for use in practicing the present invention.

Referring to FIG. 1, the hardware utilized in the image balancing system and method of the present invention is shown. A mainframe computer or other suitable type of centralized data processing unit 10 is provided for processing of the images and data. Documents are processed at a high rate of speed by a document reader/sorter indicated generally at 11. The reader/sorter is equipped with a MICR reader unit, as is well known, which reads magnetic ink characters encoded on the documents, and with one or more sorter units 11b, which serve to sort the documents into one of several bins in accordance with pre-established sort criteria. For example, the sorter unit 11b may sort the documents in accordance with MICR routing and transit codes previously encoded on the documents. The reader/sorter also includes an optical scanning unit 11c which scans the front and back of each document and captures an image of each side of the document.

Coded data read by the MICR reader unit 11a is sent to the central data processing unit 10 by a data channel 12. Image data captured by the optical scanning unit 11c is sent by a data channel 13 to an image capture processor 14. The image capture processor 14 performs various image enhancement and image data compression operations to the incoming image data. By way of example, certain of these image data processing functions are described in commonly owned U.S. Pat. No. 4,888,812 granted Dec. 19, 1989 and entitled DOCUMENT IMAGE PROCESSING SYSTEM and in commonly owned U.S. Pat. No. 4,924,521 granted 5/8/90, (Ser. No. 134,733 Filed Dec. 18. 1987) entitled IMAGE PROCESSING SYSTEM AND METHOD EMPLOYING COMBINED BLACK AND WHITE AND GRAY SCALE IMAGE DATA. The above processed image data is sent from the image capture processor 14 to the centralized data processing unit 10 via data channel 15. The large volumes of coded data and image data which are captured and processed by the system are stored on suitable storage devices, such as a direct access storage device (DASD) 16a and an optical disk storage device 16b.

The image balancing functions are primarily accomplished by an image balance subsystem, which is shown within the dotted lines in FIG. 1, in combination with the centralized data processing unit 10 and the external storage devices 16a, 16b. A controller 17 acts as an interface with the CpU 10, as well as controls the overall processing of the image balancing subsystem. An image processor 18 handles the transmission and display of image data received from the CpU 10 via a suitable data channel 12a. The controller 17 and the image processor 18 are connected to respective keying workstations 19 over a suitable network, such as a token ring network. The keying workstations 19 are manned by balancing clerks or operators to accomplish the image balancing task.

The system keeps statistic of the image balancing process. Analysis of these statistics is performed so that the overall process of customer deposits and balancing may be improved, and reports of this statistical analysis may be generated. A statement printer P is provided for printing of these reports as well as other documents.

Software Architecture Overview

Figure 2:
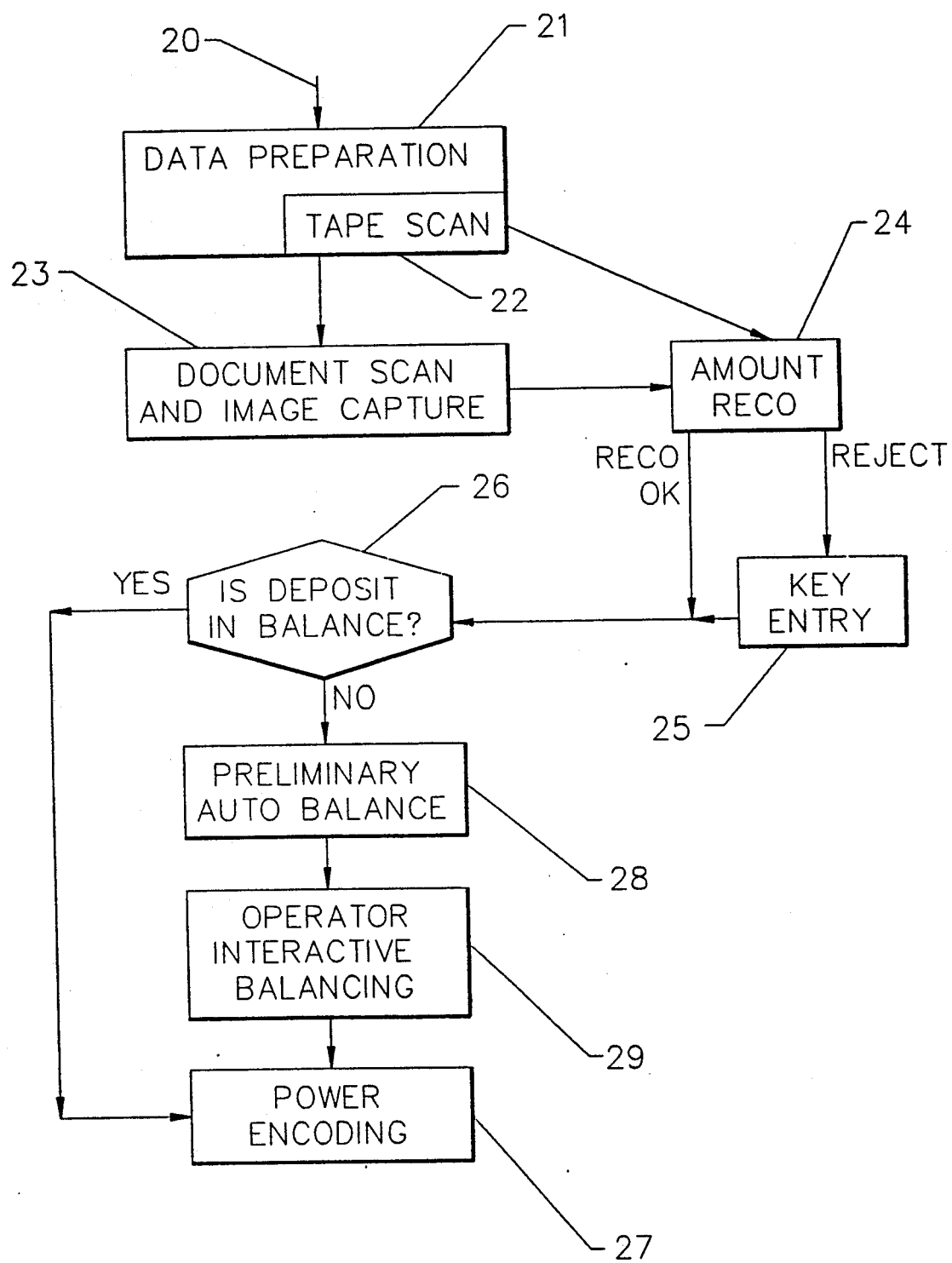
FIG. 2 is a flowchart illustrating the work flow in a document processing system which includes a balancing operation.

Referring to FIG. 2, a high level block diagram is presented to provide an overview of the work flow in the image processing and balancing environment. Incoming work 20 (e.g. deposits or batches of checks) is first subjected to a data preparation step 21. In this step, the documents are prepared for processing through the reader sorter by removing staples, paper clips and rubber bands and by properly orienting the respective documents. If any of the deposits are large commercial deposits of the type which include a deposit slip and an accompanying adding machine tape, the adding machine tape is separately scanned as indicated at 22 to capture the adding machine tape image. Then, as indicated at 23, the documents are processed through the optical scanning unit and an image of the front and back of each document (e.g. check or deposit slip) is captured. Image data from the amount field of each document is then used in the amount recognition operation 24 to automatically recognize an amount for each document. When the deposit includes an adding machine tape, the tape image data is also utilized by the amount recognition operation to assist in recognition. If the amount recognition operation 24 is unsuccessful in recognizing the amount of a document, then the image of the amount field of the document, or the image of the complete document if necessary, is presented to an operator at a workstation for manual key entry of the amount, as indicated at 25. After manual key entry of the amount, or after successful recognition from the amount recognition operation 24, the system then proceeds to determine whether the deposit is now in balance, as indicated at 26. If the deposit is in balance, then the system proceeds to the power encoding step 27 in which the amount of each document is encoded in MICR readable form onto the document. If the deposit is not in balance, the system proceeds to a preliminary auto balance step 28.

The preliminary auto balance processing indicated at 28 is a type of artificial intelligence-like procedure which uses all available information to make decisions regarding errors giving rise to an out-of-balance condition. The preliminary auto balance operation will automatically identify and correct errors, if possible, as well as identifying those errors which cannot be automatically corrected but which require the attention of an operator. Thus, only those deposits which are not corrected by the preliminary auto balance process and which are still out of balance are directed to the operator interactive balancing operation indicated at 29.

One function of the preliminary auto balance procedure is to identify and highlight potential errors to the operator. The procedure may, for example, do basic validity checking of the recognized amounts to determine if they make sense. For instance, if a check amount were found which was greater than the total for the deposit, the accuracy of that check amount would be suspect. Other procedures may also be used to identify potential amount recognition errors. In the amount recognition procedure (24 in FIG. 2) a probability value may be assigned to each recognized character corresponding to the degree of certainty of a correct recognition. Those documents having a certain threshold probability that characters were incorrectly recognized can be highlighted to the operator for closer inspection. An example of one type of error identification and correction procedure which may be utilized in the preliminary auto balance operation 28 is disclosed in commonly-owned Dinan et al. U.S application Ser. No. 07/491,896 filed concurrently herewith, entitled DOCUMENT PROCESSOR INCLUDING METHOD AND APPARATUS FOR IDENTIFYING AND CORRECTING ERRORS. Another type of error which may be detected in the preliminary auto balance operation is a transposition error, where an operator transposes the order of two digits during the keying process, e.g. enters "89" instead of "98." Known algorithms can be utilized to identify suspected transposition errors, and these potential errors can be highlighted to the operator for consideration.

If the deposit is not balanced, control and the unbalanced deposit along with those items which are identified as potential inaccuracies or discrepancies will be passed to the operator for interactive balancing 29. The operator will balance the deposit in an interactive mode on a terminal screen using an image of the depositor summary document, system generated coded amounts of the individual transaction amounts and images of the original transaction documents. This operator interactive balancing process will be described in more detail with reference to FIG. 3.

Upon completion of the balancing process, reports may be generated containing statistics of the balancing process, i.e. preliminary auto balancing and operator interactive image balancing. The statistics calculated may include representations of a number of system errors versus the number of depositor errors. The statistics may also be kept and reported of the operator's actions in order to correct the inaccuracies or errors which caused the imbalance in the deposit, or the time required to correct errors. Another statistic which may be kept is how many substitutions in the image balancing process were made. It will be understood by those skilled in the art that many other types of statistics may be kept in which balancing reports may be generated.

Balancing Flow

Figure 3A:
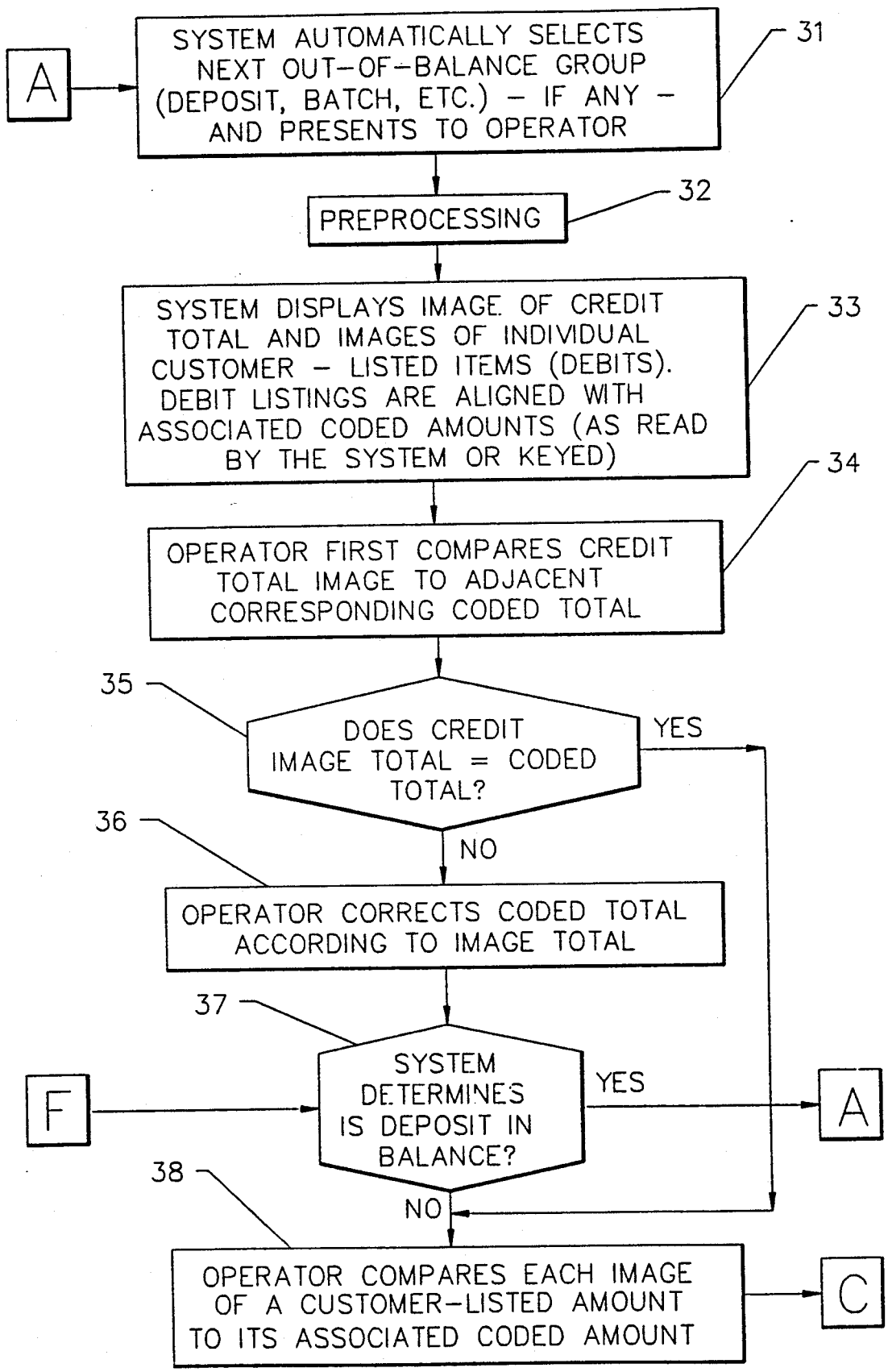

The tasks and order of tasking for image balancing will now be described. Referring to FIG. 3A, step 31, the system selects an out-of-balance group (e.g. deposit or batch). In the preprocessing step indicated at 32, the information which is to be presented to an operator is prepared and formatted to facilitate viewing and error correction by the operator. For example, the preprocessing may include manipulating the images of the individual transaction amounts as listed on the depositor summary document and the corresponding coded data amounts for the respective transaction documents obtained from the MICR code on each document so that the images of the transaction amounts and the corresponding coded data amounts can be readily compared by the operator. This may, for example, include processing so that the coded data amounts and the corresponding transaction amount images appear in a similar line spacing. This procedure is described more fully below in connection with FIG. 4. The preprocessing may also include sorting or arranging the information so that coded data amounts appear in a similar sequence as the corresponding transaction amount images appear. This procedure is described more fully below in connection with FIG. 5.

Then, as indicated at 33, the information is displayed to the operator. The information includes the image of the total amount shown on the depositor summary document (i.e. the credit total), as well as the images of the individual transaction amounts as listed by the depositor on the summary document. Depending upon the nature of the group (i.e. deposit, batch, etc.) the depositor summary document may be in the form of a customer deposit slip with listed check amounts, or an adding machine tape containing an itemized listing of the amounts in a deposit together with a total. In addition to the credit total, the image of each depositor-listed transaction amount is also displayed. These images represent the depositor's record of the transaction. In addition, the bank's record of each transaction amount is also displayed. This takes the form of the coded data amount for each transaction document, as derived from the reco or keying process. By comparing the depositor record (e.g. summary document images) and the bank record (i.e. coded data amounts for each transaction) the operator is able to identify discrepancies and thereby locate the error or errors causing an out-of-balance condition.

A significant feature of the present invention resides in the way in which this information is presented to the operator to facilitate and expedite identification of discrepancies and correction of errors. Preferably, the images of the transaction amounts and the corresponding coded data amounts are displayed in close proximity to one another so that the operator can more easily compare amounts and identify discrepancies. More specifically, the present invention in its preferred form utilizes windowing techniques to display the information in separate adjacent display areas or "windows". A first display area or window contains images of the respective transaction amounts as listed on a depositor summary document. A second display area or window contains the coded data amounts associated with each individual transaction document. As a result of the preprocessing operation 32, the transaction amount images and their corresponding coded data amounts are displayed in a similar line spacing and similar sequence so that they appear substantially side by side.

In the embodiment illustrated herein, the two displays appear as two side-by-side columns where each row contains amounts. The rows in the first column contain the images of the depositor summary document including the individual transactions listed on that document. The rows in the second column contain the coded data amounts for the respective individual transaction documents.

The operator then proceeds to compare the image amounts in the first display with the corresponding coded data amounts in the second display. The comparison can be made using a scrolling technique whereby the operator can scroll both displays of the image encoded amounts together or independently scroll the first display containing the image amounts or the second display containing the coded amounts. This scrolling permits the operator to easily identify potential inaccuracies which may be causing the imbalance condition. This scrolling feature can also be used by the operator to readjust the individual image amounts as well as the coded amounts in order to bring them into better alignment or to correctly correspond a given coded amount in the second display to its image amount in the first display.

A particularly suitable type of display format for use in the present invention employs the standard conventions and icons employed in the IBM Presentation Manager user interface (IBM is a trademark of International Business Machines Corporation), as shown for example in FIG. 7A, which forms a part of the illustrative examples which follow. As shown in FIG. 7A, a first display area 140 includes, in a column, images of the amounts of a series of transactions taken from a customer deposit slip. In the next column to the right, a second display area 142 shows the coded data amounts for the corresponding transaction documents. This type of user interface is most conveniently operated by use of a pointing device such as a mouse. Scroll arrows 143, 144, and 145 are provided at the left, center and right hand side of the columns respectively. By "clicking" on the left scroll arrow 143 and scrolling the information up or down, the operator can vertically displace the first display relative to the second display. Similarly, by clicking on the right hand scroll arrow 145, the coded data amounts in the second display area 142 can be moved independently of the corresponding transaction amount images in the first display area 140. The center scroll arrow 144 allows the operator to move the two columns simultaneously as a unit. The operator can also click on an appropriate option, such as the "Next Error" option at the bottom of the screen, which will cause the cursor to move to the next potential error, and will scroll both displays if the next potential error is not already displayed on the screen at the time. The overall display screen also includes a separate display area or window 146 containing the image of the total deposit amount as recorded on the depositor summary document. In addition, the display contains a credit field 148 displaying the credit total derived by character recognition or keying of the total shown on the depositor summary document. Also provided is a debit field 149 showing the calculated debit total derived by adding the coded data amounts for all items in the second display 142. Also included is a difference field 150 showing the difference by which the group or deposit is out of balance. The display additionally includes an adjustment field 152 where the total of any adjustments will be displayed.

Referring again to FIG. 3A, at the block indicated by reference character 34, the operator or clerk first compares the image of the total amount of the depositor summary document in the window 146 to the coded credit total amount derived by recognition or keying of the total image, as shown in credit field 148 (FIG. 7A). This indicated in the flowchart at 35. If the amount indicated by the image total of the depositor summary document is not equal to the coded credit total, then there was a recognition or keying error in the coded total and the operator proceeds to correct the coded total listed in the credit field 148 so that it will be in accordance with, i.e. equal to, the image total of the depositor summary document, as indicated at 36. The system then proceeds to determine whether the deposit is now in balance, as indicated at 37. In the event that a balance state exists, the system proceeds to search through the remaining groups to select the next out-of-balance group, as indicated at 31.

If the image displayed in the first display is still out of balance with the corresponding coded amounts listed in the second display, the operator proceeds compare each image of the depositor listed amount with its corresponding coded amount, as indicated at 38. Amounts containing probable errors, as determined by the preliminary auto balance step described earlier, are highlighted for easy identification by the operator. Beginning with the highlighted suspected errors, the operator proceeds to compare each image amount of the depositor summary document as displayed in the first display with its aligned, corresponding coded amount displayed in the second display. The coded amounts in the second display are the result of the conversion to coded form by RECO or keying of the scanned image of the transaction document.

Figure 3B:
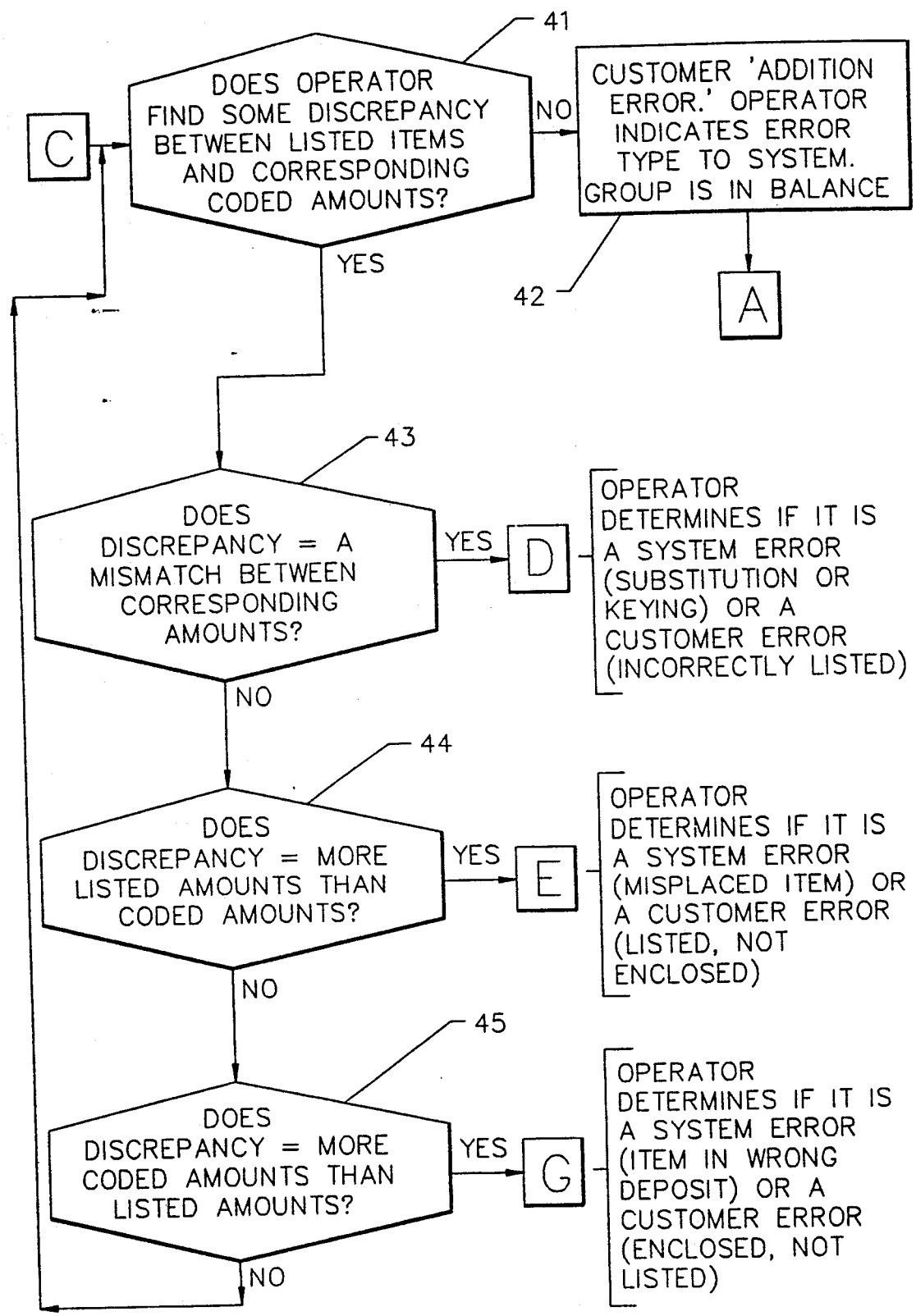

Continuing with FIG. 3B, comparison is made on a line by line basis. If the operator finds no discrepancy between the individual transactions listed in the depositor summary document image of the first display and the corresponding coded amounts listed in the second display, as indicated at 41, the result is due to a depositor addition error on the depositor summary document. The operator makes an indication to the system that the error was a depositor addition error, indicated at 42. The current group being processed is now in balance and the process returns to FIG. 3A, block 31, so that the identification of the next out-of-balance group may be made.

If a discrepancy is found by the operator between an individual transaction amount listed on the depositor summary document and the corresponding coded amount listed in the second display, processing continues as indicated at 43 to determine whether the discrepancy is a mismatch between a transaction amount as listed on the depositor summary document image and the corresponding coded amount. If such a mismatch is found, control passes to transition Block D, which is continued on FIG. 3C. At this point, the system continues processing in an effort to determine whether the error is a system error (such as a reco or keying error) or a depositor error (such as the incorrect listing of a transaction on a depositor summary document). This process will be described in more detail with reference to FIG. 3C.

In the event that the discrepancy is not a mismatch between the individual transactions listed in the image of the depositor summary document and the corresponding coded amounts, a further query 44 is made by the system to determine whether the discrepancy is due to there being more individual transactions listed in the summary document image than coded amounts in the second display. In the event there are more transactions listed in the first display than corresponding coded amounts appearing in the second display, control is passed to Block E. Processing will then continue as shown in FIG. 3D, described in more detail below, in an effort to determine if the error is a system error such as a misplaced item, or whether the error is a depositor error, such as where an item is listed on a depositor summary document but the corresponding individual transaction document was not enclosed.

If the discrepancy is not a result of there being more individual transactions listed in the summary document image in the first display than corresponding coded amounts for each individual transaction displayed in the second display, a further query 45 is made as to whether there are more coded amounts for each associated individual transaction document displayed in the second display than corresponding amount images in the first display. In the event more coded amounts for individual transaction documents appear in the second display than individual transaction amounts listed in the summary document image of the first display, control passes to transition Block G. Processing will then continue as described more fully in FIG. 3E below to determine whether the error is a system error in that the individual transaction document is in the wrong deposit group, or in the alternative, the error is a depositor error in that the individual transaction document was enclosed within the group but not listed on the summary document. If there are no more coded amounts in the second display than listed transaction amounts in the summary document image, the operator has missed the error, and the procedure shown in FIG. 3B is repeated to determine whether a discrepancy actually exists and if so the reason for the discrepancy.

Figure 3C:
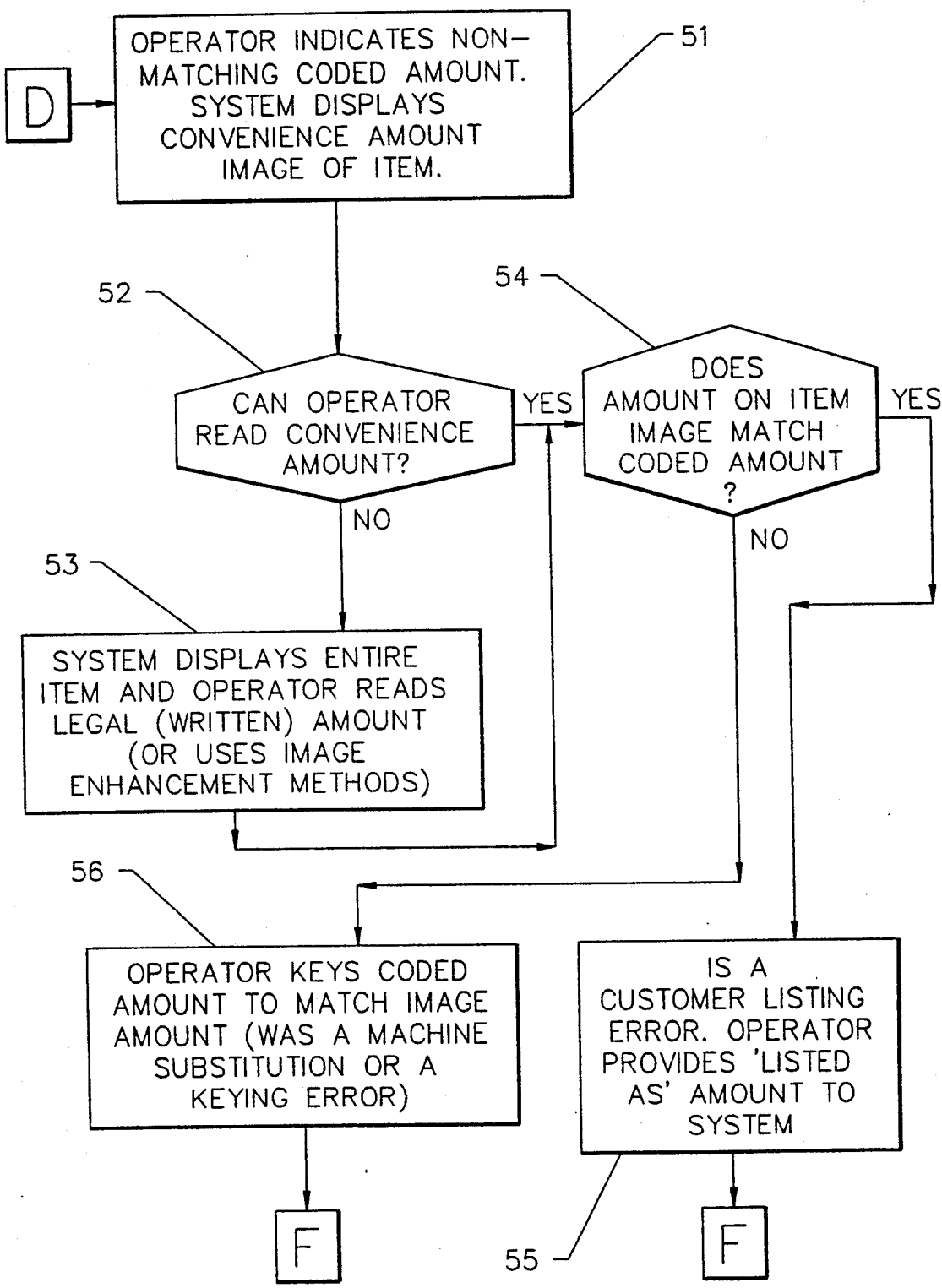
Figure 3D:
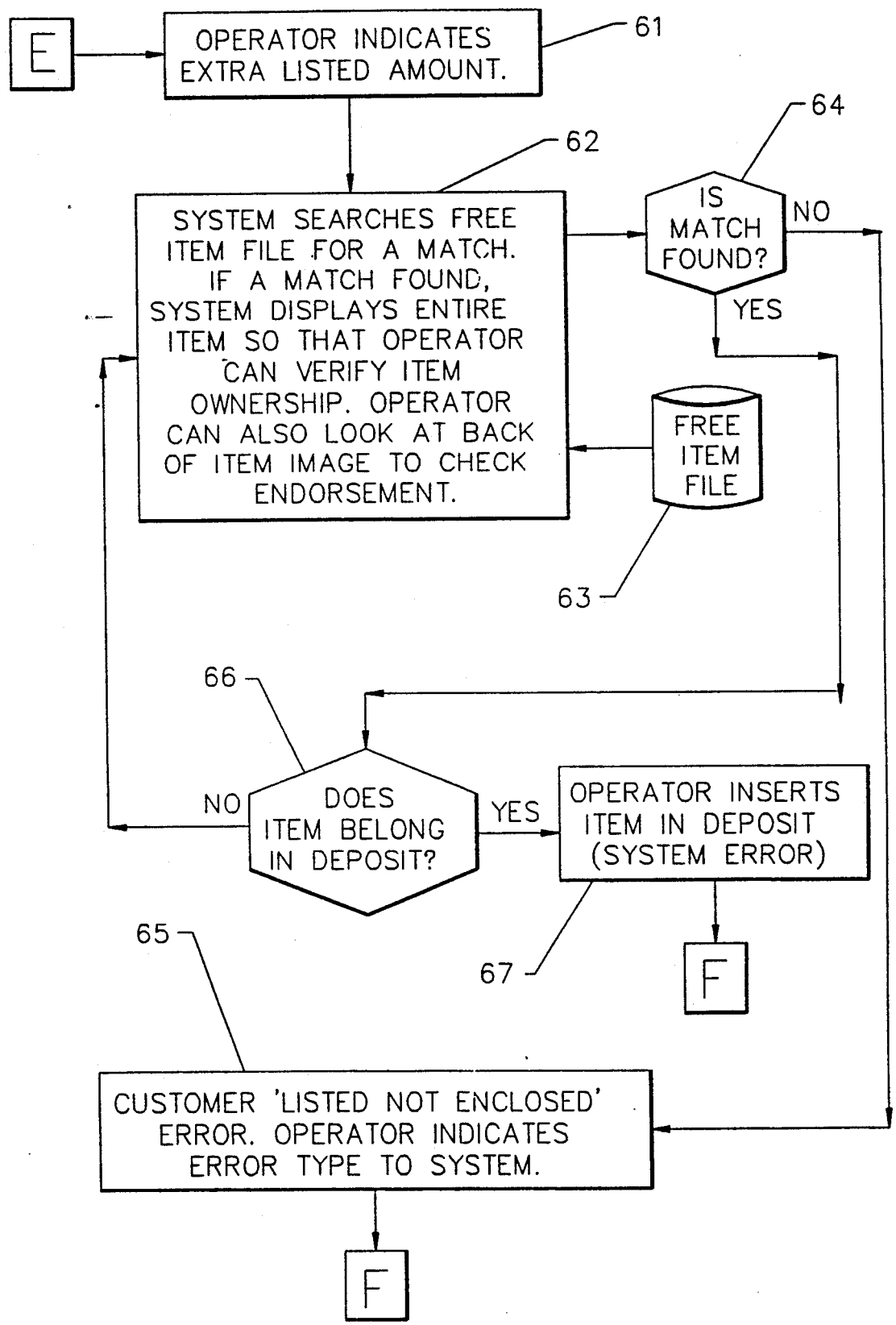

Referring now to FIG. 3C, the procedure indicated at 51 is reached in the event that the discrepancy found by the operator is due to a mismatch between the individual transaction amounts listed in the summary document image and the corresponding coded amounts for each individual transaction. The operator then indicates which listed amount in the first display or which coded amount in the second display is nonmatching. In a preferred embodiment, this indication by the operator may be made using a mouse so that the operator may double click on the nonmatching coded amount.

Once indicated, the system displays the amount image used to determine the coded data amount, which may be the convenience amount or the full check image. In the case of a check, this convenience amount image is the image of the dollar amount as written or printed in numbers on the check.

In a preferred embodiment, this convenience amount image can be displayed in a third display area on the same screen as the first and second display areas. If the operator is able to read the convenience amount from the convenience amount image displayed on the screen (block 52), a determination 54 is made whether the amount provided in the convenience amount image is the equivalent of the associated coded amount.

If the operator is not able to read the convenience amount image, the entire image of the actual individual transaction document can be displayed, as indicated at 53. The entire transaction document image includes the convenience amount as well as the equivalent of that amount written out in longhand. This amount written out in longhand is also known as the legal amount. From the display of the entire transaction document image, the operator reads the legal or handwritten amount. Various image enhancement techniques or methods may be used to enhance the image to enable reading by the operator.

A determination 54 is then made whether this handwritten legal amount from the image of the entire individual transaction document is equivalent to the associated coded amount in the second display. If the amount read by the operator, whether it be a result of reading the convenience amount image or the legal written amount from the entire transaction document image, is equivalent to the corresponding coded amount in the second display, the error is a result of a mistake made by the depositor in listing the transaction on the depositor summary document. The operator then keys in the amount which was read from the first display area, i.e. the depositor listed amount, to the system, as seen at 55, so that an adjustment and an appropriate depositor advice can be generated. The process then continues as shown in FIG. 3A, where a determination 37 is made whether the deposit is in balance.

If the amount read by the operator, whether it be a result of reading the convenience amount image or reading the legal amount from the image of the entire transaction document, is not equivalent to the associated coded amount in the second display, then the error was due to incorrect recognition or keying. The operator will then enter the amount read from the image so that the coded amount will then match the image amount. This coded amount may be entered by the operator using a keyboard, as indicated at 56 in FIG. 3C. Processing then continues as shown in FIG. 3A.

Referring to FIG. 3D, this procedure is followed as result of more transactions being listed on the depositor summary document than coded amounts appear in the second display. As indicated at 61 the operator indicates which transaction amount image is the extra. The operator can make this indication by double clicking on the extra transaction amount image in the first display.

A free item file 63 is used by the system as a suspense file for storing data regarding extra or misplaced documents. A search 62 is made of the free item file 63 in order to find whether an individual transaction document exists whose coded data amount matches the extra listed transaction amount in the first display. If an individual transaction document is located in free item file 63 which matches the extra transaction amount (block 64), the system will display the image of the entire transaction document located in the free item file. From this display of the document image, the operator can verify whether that particular transaction document belongs in the deposit. This is necessary in order to determine whether the individual transaction document located in the free item file is owned by the customer whose depositor summary document is presently being processed. Thus, for example, the operator can verify whether the payee of the check is the depositor. Images of both sides of the individual transaction document are available. This permits the operator to also view the reverse side, i.e. back of the transaction document, in order to check the endorsement. Thus, if it is a third party check, the operator can verify whether the check was endorsed to or by the depositor. This acts as a further verification of the ownership of the individual transaction document.

If no match has been found, i.e. a transaction document does not exist in the free item file 63 which, matches the transaction amount image listed in the summary document image in the first display, this particular error in balancing is the result of the depositor listing a transaction on the summary document for which there is no actual individual transaction document, i.e. listed transaction with no enclosed transaction document. The operator makes an indication of this error type to the system as indicated at 65. The system will generate a corresponding adjustment record to correct the depositor's account. The process is then continued as shown in FIG. 3A where the system determines whether the deposit is now balanced.

If an individual transaction document is located in the free item file 63 which corresponds to the extra transaction amount in the first display, i.e. a match is found, and if the operator concludes from inspection of the document image that this located transaction document from the free item file belongs in this particular deposit (66), the operator will insert this transaction into this deposit, as indicated at 67. The coded amount will then appear in the second display in alignment with the corresponding transaction amount image in the first display. The process then continues as shown in FIG. 3A where a determination is made as to whether the deposit is now balanced.

If the transaction document located in the free item file 63 does not belong in this particular deposit, then the free item file is again searched in order to locate another match. If a match is found, the process of displaying the entire image of the transaction document from the free item file, both front and back sides, will proceed so that verification can take place. This process will continue until either a match is found and therefore inserted into the deposit (block 67) or no match is found and the error type is indicated (block 65).

Figure 3E:
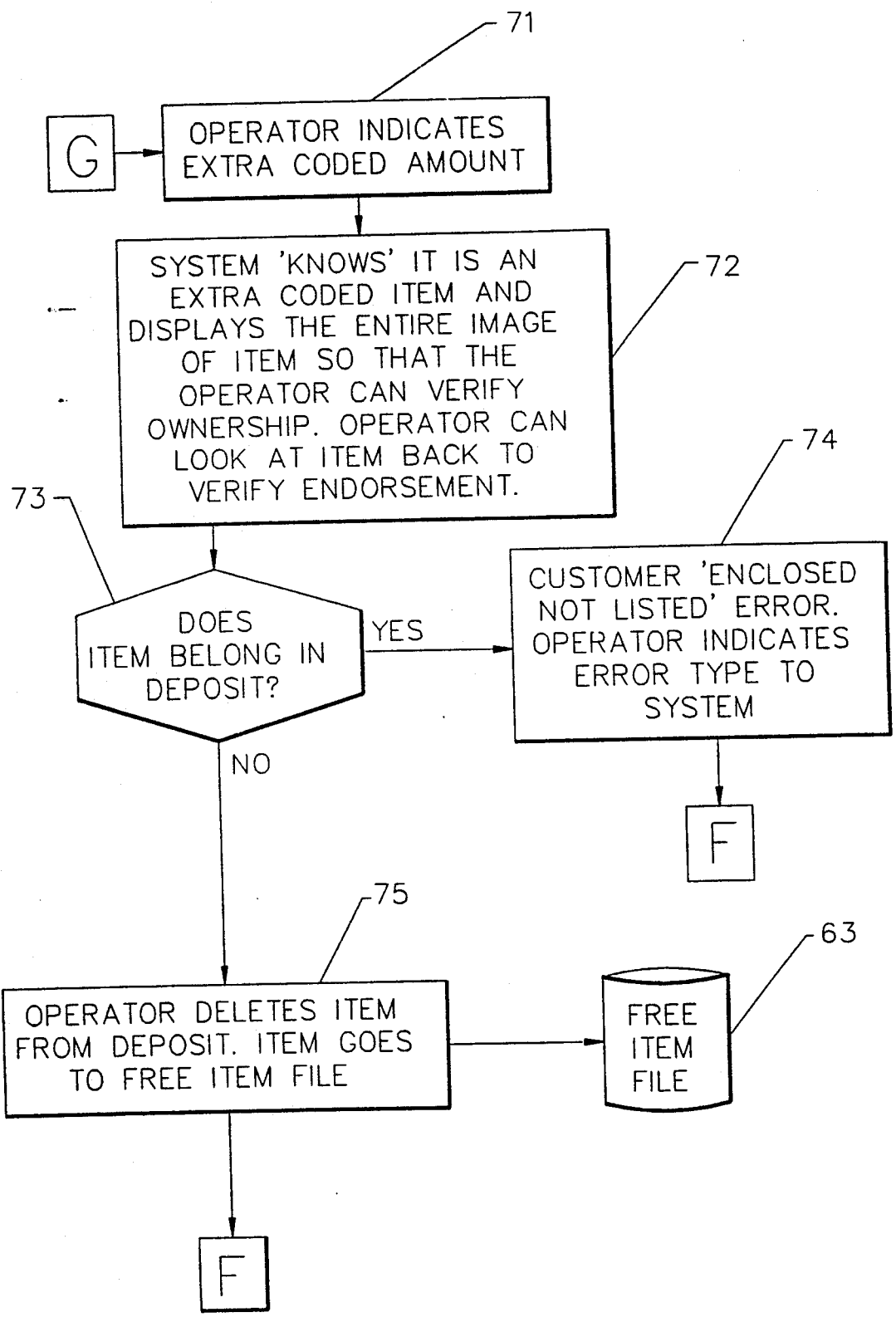

Referring to FIG. 3E, the procedure illustrated here is followed when a greater number of transaction coded amounts appear in the second display than the number of corresponding transaction amount images listed on the summary document in the first display. As indicated at 71, the operator indicates which particular transaction coded amount in the second display is extra.

The system then accesses the storage means which contains the image of individual transaction document with which the amount is associated, as indicated at 72. The entire image of the associated individual transaction document is displayed on the screen in order to permit the operator to verify ownership. Images of both sides of the document can be displayed so that the operator can verify the payee, as well as the endorsement on the reverse side of the transaction document. This third display appears on the same screen as the first and second display areas as a separate display area or "window".

A determination 73 is made whether this transaction belongs in this deposit presently being processed. If this transaction does belong in the deposit presently being processed, the reason for this particular error is that the transaction document was enclosed as part of the deposit but was not listed by the depositor on the depositor summary document. The operator then indicates to the system that this was a depositor error and furthermore that the error was an enclosed transaction document which was not listed on the depositor summary document, as indicated at 74. If it is determined that the transaction document does not belong in the deposit which is presently being processed, the operator will delete the corresponding transaction coded amount listed in the second display, as indicated at 75. Information about this individual transaction document (e.g. its coded data amount and a pointer to its stored image data) will be stored in free item file 63.

Preprocessing Flows

The primary function of the preprocessing operation, which is indicated generally at 32 in FIG. 3A, is to prepare the data in an appropriate form for presentation to the operator on a display. The preprocessing operation assures that the information is displayed in a format which is most conducive to identifying discrepancies between the amount images from the depositor summary document, presented in the first display, and the corresponding coded data amounts which are attributed to each individual document, and which are displayed in the second display. Two significant functions which are performed during preprocessing are to manipulate the spacing and the sequence of the amounts shown in the two displays so that corresponding transactions are shown in side-by-side relation on the same row of two adjacent columns.

Figure 4:
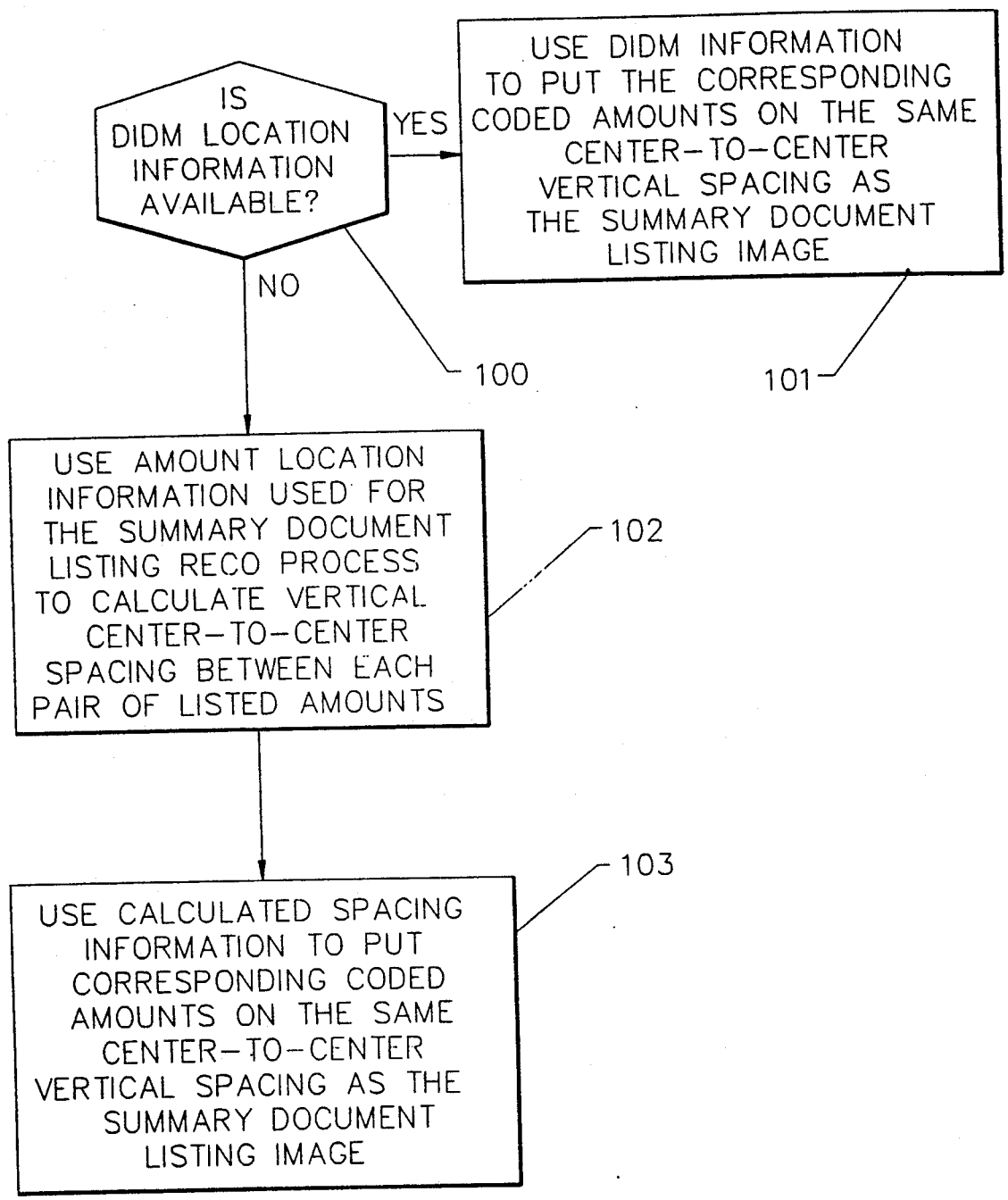
FIG. 4 is a flowchart illustrating one of the preprocessing operations indicated in FIG. 3A.

Since the depositor summary document can take many different forms, such as an adding machine tape or various types and styles of customer deposit slips, there is no assurance that the images of the individual transaction amounts as listed on the depositor summary document would have the same line spacing as the line spacing used to display the coded data amounts in the second display. The preprocessing operation provides for arranging the coded data amounts in the second display in a similar line spacing as the corresponding transaction amount images appear in the first display. FIG. 4 illustrates how this may be achieved.

When a depositor summary document is processed, a query too is made whether DIDM location information is available for this particular depositor. A DIDM (document identification description macro) file is maintained by the system and contains information which enables the system to identify, for a particular account number, the size and style of check and deposit slip used, the location of the amount field on the check, the center-to-center vertical spacing of the transaction amount fields on the deposit slip, the location of the deposit amount total, and other pertinent information. If DIDM information is available for the particular depositor, then as shown at 101, the DIDM information regarding the center-to-center vertical spacing of the transaction amounts is used to achieve the same line spacing between the transaction amount images in the first display and the coded data amounts in the second display. The line spacing between the amounts or both displays can be adjusted as necessary.

If DIDM location information is unavailable, then information which was obtained during scanning and recognition of the depositor summary document is utilized to calculate the vertical center-to-center spacing between each listed transaction on the depositor summary document, as indicated at 102. Then, as shown at 103, the calculated spacing information is employed to adjust the spacing between the corresponding coded data amounts on the second display so that they appear at the same center-to-center vertical spacing and thus are in alignment.

Figure 5A:
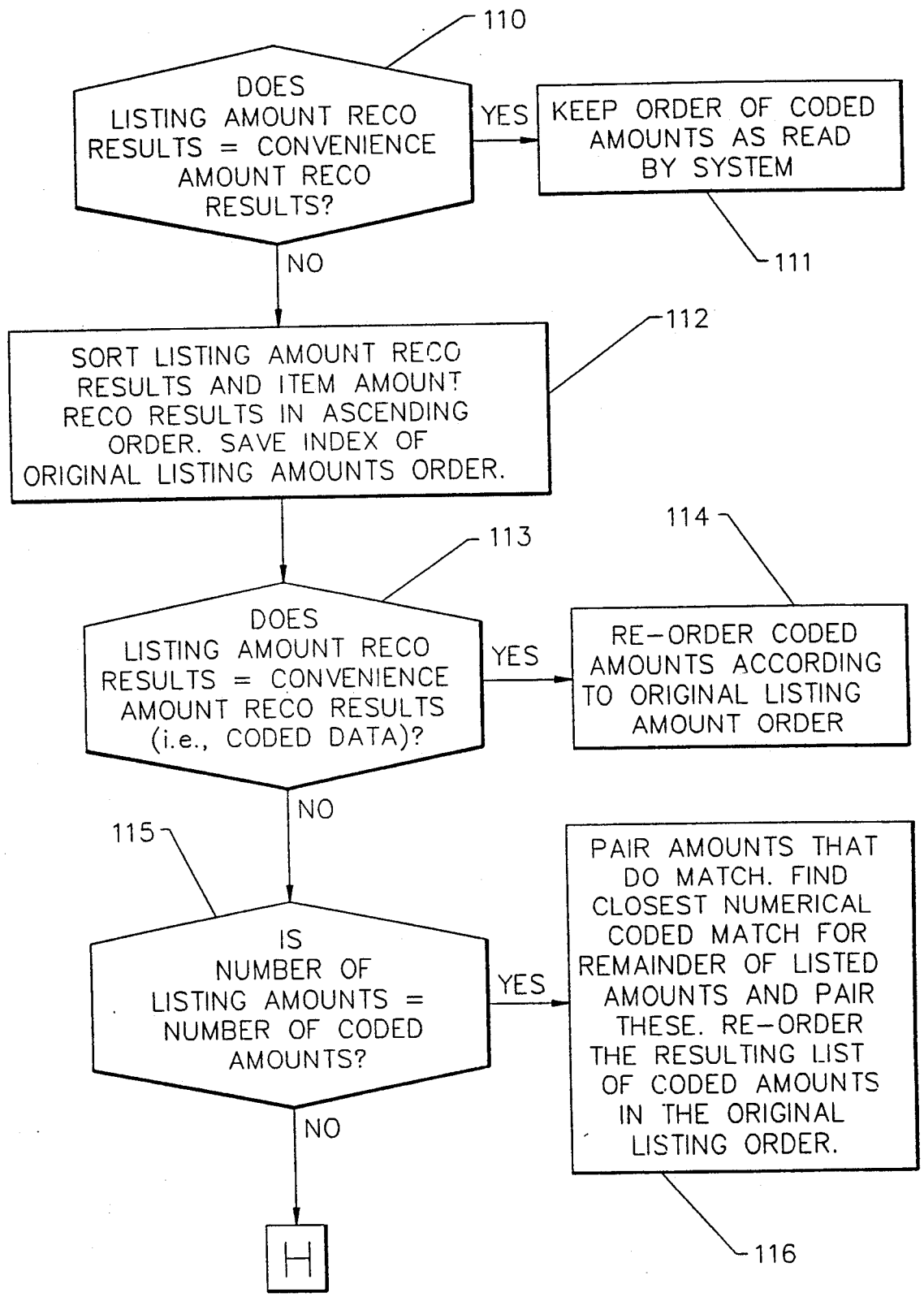
FIGS. 5A and 5B are flowcharts illustrating another of the preprocessing operations indicated in FIG. 3A.
Figure 5B:
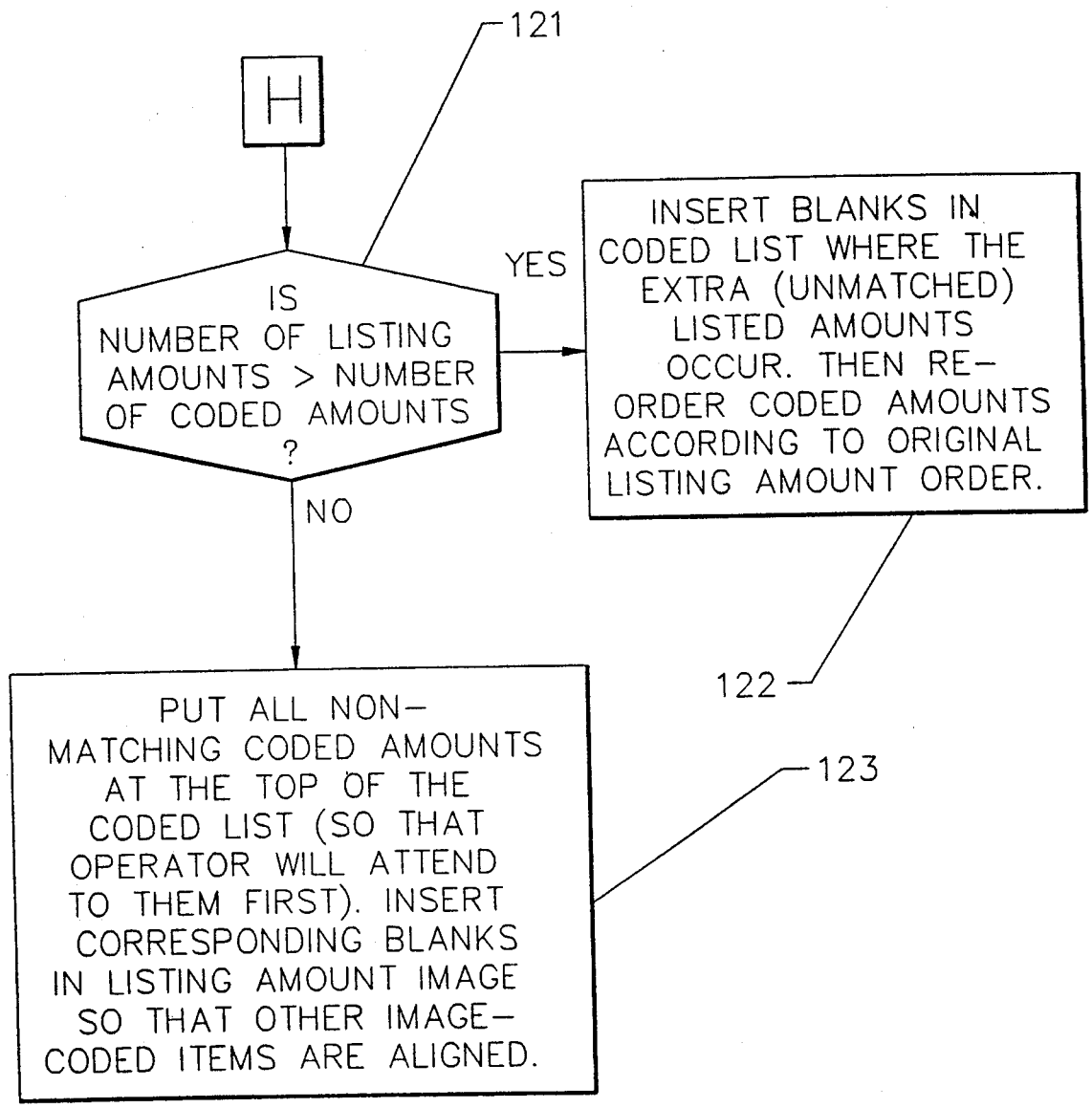

Another important function of the preprocessing operation is to assure that the coded data amounts in the second display are arranged in a similar sequence as the corresponding transaction amount images appear in the first display. Thus, the operator can quickly identify matching pairs of amounts and locate any discrepancy. When a customer deposit is received, the individual checks may not necessarily be arranged in the same sequence as they are listed on the deposit slip, or a deposit could be accidentally shuffled during processing or handling, thus getting the individual checks out of sequence. FIGS. 5A and 5B illustrate a procedure for arranging the amounts so that corresponding amounts appear in the same sequence when presented to the operator.

The procedure begins With a determination 110 whether the results of the recognition processing of the transaction amount images on the summary document image equal the results of the coded data amounts derived by recognition processing of the amount field of each individual transaction document. If the recognition results of the transaction amount images listing does equal the convenience amount recognition results, the order of the transaction coded amounts as read by the system is maintained without change, as indicated at 111.

If the recognition results of the transaction amount images on the summary document listing is not equal to the coded data amounts, then as shown at 112, the two sets of amounts are sorted in ascending order. The index of the order of the original listing of the coded data amounts in the second display is saved.

The next step of this process is a determination 113 whether, after this rearranging, the results of the recognition processing of the summary document image are equal to the recognition results of the transaction coded data amounts. If the two are equal, then as indicated at 114, the transaction coded amounts in the second display are reordered according to the original order of the summary document image listing.

If the two are unequal, the system then determines whether the number of transaction amount images in the first display is equal to the number of corresponding transaction coded data amounts displayed in the second display, as seen at 115. If the number of images in the first display is equal to the number of coded amounts in the second display, the system proceeds to pair, i.e. match, the coded amounts in the second display to the corresponding transaction amount images in the first display, as indicated at 116. This correspondence can be achieved in many ways which are known by those skilled in the art. The remaining transaction amount images in the summary document in the first display are matched to the coded amounts in the second display which are numerically closest to one another. This matching is done on a pair by pair basis. The resulting list of transaction coded amounts in the second display is then reordered in accordance with the original listing order of transaction amount images in the summary document image in the first display.

If the number of transaction amount images in the summary document displayed in the first display is not equal to the number of coded amounts in the second display, a determination is made as to whether the number of transaction amount images in the first display is greater than the number of corresponding transaction coded amounts provided in the second display, as indicated at 121 on FIG. 5B. If this number is greater, blanks are inserted into the list of coded transaction amounts in the second display. The blanks are placed so as to correspond to the extra or unmatched transaction amount images of the summary document image from the first display. The order of the transaction coded amounts listed in the second display is then reordered, i.e. changed, so as to be the same as the order of the transaction amount images in the original summary document image, as indicated at 122.

If the number of amounts in the summary document image is not greater than the number of the coded amounts in the second display, the system proceeds to place all transaction coded amounts which have no matching or corresponding transaction amount image in the first display at the top of the list of the transaction coded amounts in the second display, as indicated at 123. This is done so that the operator will see these coded amounts which lack a match and process them first. Blanks are then inserted into the summary document image in the first display so that the other transaction amount images in the first display are aligned with the corresponding transaction coded amounts in the second display.

This procedure for maintaining the order of the two displays permits manipulation of the contents of each display so that the individual items within the first display, i.e. the transaction amount images, will correspond to the appropriate items of the second display, i.e. the transaction coded amounts. The system may also provide the operator with a way to check off those items which the operator has considered, to thus facilitate the error identification and balancing process.

Examples of Screen Displays

The examples which follow illustrate a number of the possible situations which may arise in a balancing operation and show how they are dealt with in accordance with the present invention.

Example 1

FIG. 6A illustrates a typical display screen which is presented to an operator during a balancing operation. This display screen utilizes a user interface which is particularly suited for use with a pointing device such as a mouse. The operator can select from various options by pointing with the mouse to an option and "clicking". As shown in FIG. 6A the display includes a first display area or window 140 containing the images of the handwritten transaction amounts from a customer deposit slip and a second display area or window 142 containing the corresponding coded data amounts for the respective transactions. A separate display area or window 146 contains the image of the handwritten total from the deposit slip. The display also includes a credit field 148 which shows the total credit amount obtained by keying or character recognition of the handwritten total displayed in Window 146. An adjustment field 152 indicates any adjustment made to the depositor account, a debit field 149 displays the calculated total of the coded data amounts from window 142, and a difference field 150 shows the difference between the credit field and the debit field and indicates the amount by which the group of transactions is out of balance.

In the example illustrated in FIG. 6A, the system is out of balance by $42.10. The operator, in comparing the amounts in the two displays, can readily see that a coded item in the amount of $42.10 appears in the coded item display for which there is no corresponding transaction amount image in display 140.

Figure 6B:
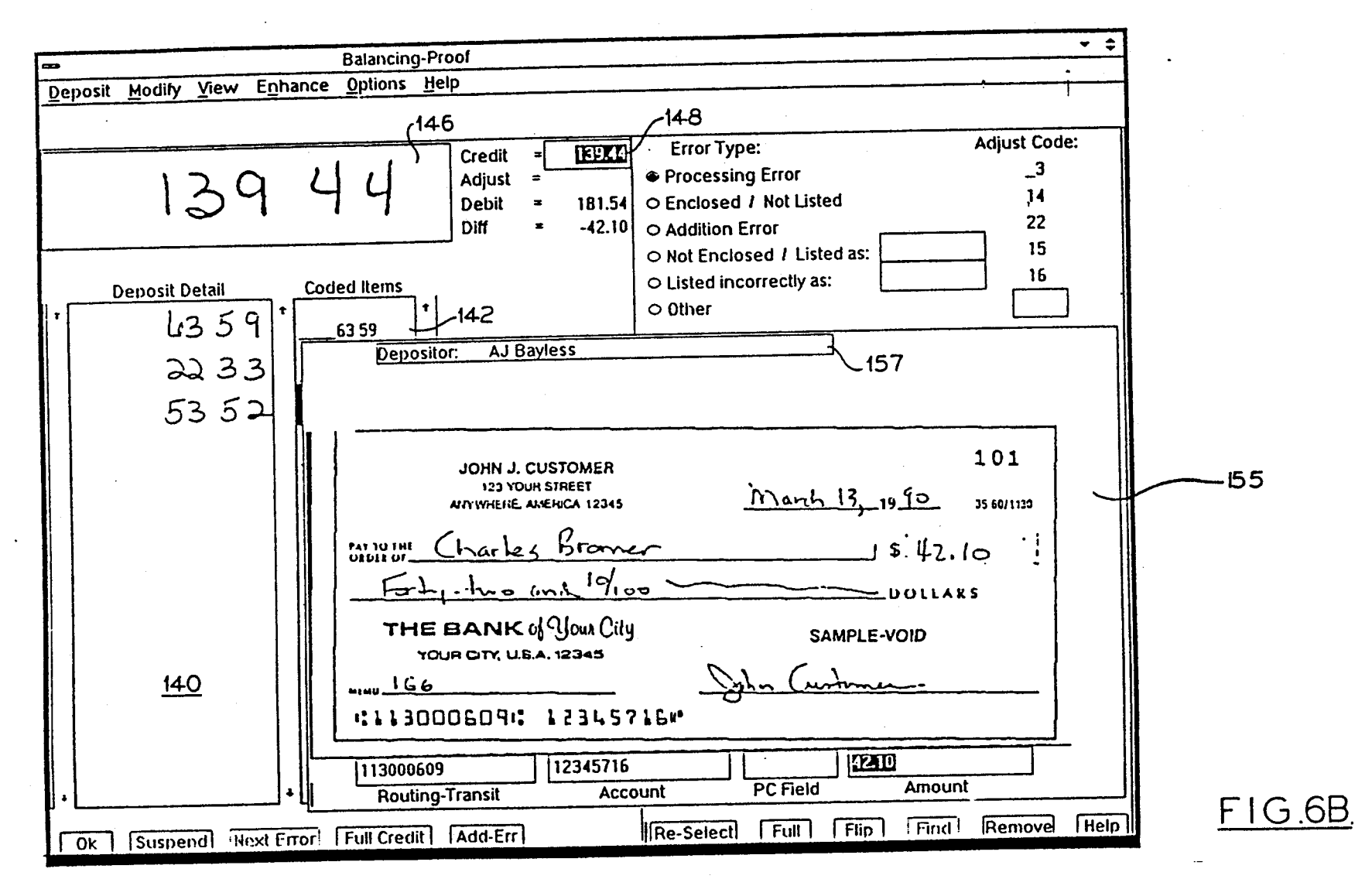

When the operator indicates (i.e. double clicks on) the extra $42.10 amount, an additional window or display area 155 appears on the screen as shown in FIG. 6B, in which there is shown the image of the face of the check from which the $42.10 amount was obtained. The operator may then verify whether the check belongs with the particular deposit. From the account information previously obtained, the system can search the bank's CIF (customer identification file), if available, and can thus display the name of the depositor in a depositor field 157. Also, the image of the entire deposit slip may be displayed, if needed, to show the identity of the depositor. The operator compares the payee listed on the check to the name of the depositor shown in the depositor field 157 to determine whether the check belongs in the deposit. In this instance, the name of the payee does not match the name of the depositor. The operator can look at the reverse side of the check by clicking on the option "Flip" at the bottom of the screen. Then, the reverse side of the check is displayed as shown in FIG. 6C. By inspecting the endorsements on the reverse side of the check the operator sees that the check was endorsed by the payee, A. J. Bayless, and thus concludes that the check belongs with the deposit. This is a depositor error in which the item was enclosed but was not listed on the deposit slip. In the upper right hand corner of the screen as shown in FIGS. 6B and 6C shows options of several possible error types. The operator clicks on the error type "Enclosed/Not Listed". The system adds the 42.10 item to the list of coded items in display 142 and generates an adjustment of 42.10 in the adjustment field 152 as shown in FIG. 6D. This results in an adjustment of 42.10 to the depositor's account, and the system can also automatically generate an advice to be sent to the depositor which includes an image of the deposit slip, an image of the item in question, and an explanation of the error. The system recalculates the credits, debits and adjustments and indicates that this particular deposit is now in balance since the amount shown in the difference field 150 is zero.

Example 2

The screens illustrated in FIGS. 7A through 7H are from a large commercial deposit wherein a large number of checks are deposited along with a deposit slip on which is written the deposit total and with an accompanying adding machine tape listing each check and giving an adding machine total. In this instance, window 140 contains the images of the transaction amounts as listed on the adding machine tape. Window 142 contains the corresponding coded data amounts. Window 146 contains the image of the handwritten total from the deposit slip. An additional display area or window 160 shows the image of the total from the adding machine tape. Adjacent to the adding machine total window 160 are fields showing credit, adjustment, debit and difference for the items associated with that particular adding machine tape. As in the display shown in FIG. 6, there is also provided a credit field 148, an adjustment field 152, a debit field 149 and a difference field 150, all of which apply to the overall deposit which is being balanced.

The difference field 150 shows that this deposit is out of balance by $1.60. The operator initially compares the image of the total of the deposit shown in window 146 to the credit total indicated in credit field 148, which is generated from keying or recognizing the total line from the deposit slip, to ensure that the credit amount was correctly recognized or keyed from the deposit slip total. Since these amounts agree, the operator then proceeds to compare the tape detail with the coded items to locate the discrepancy.

Figure 7C:
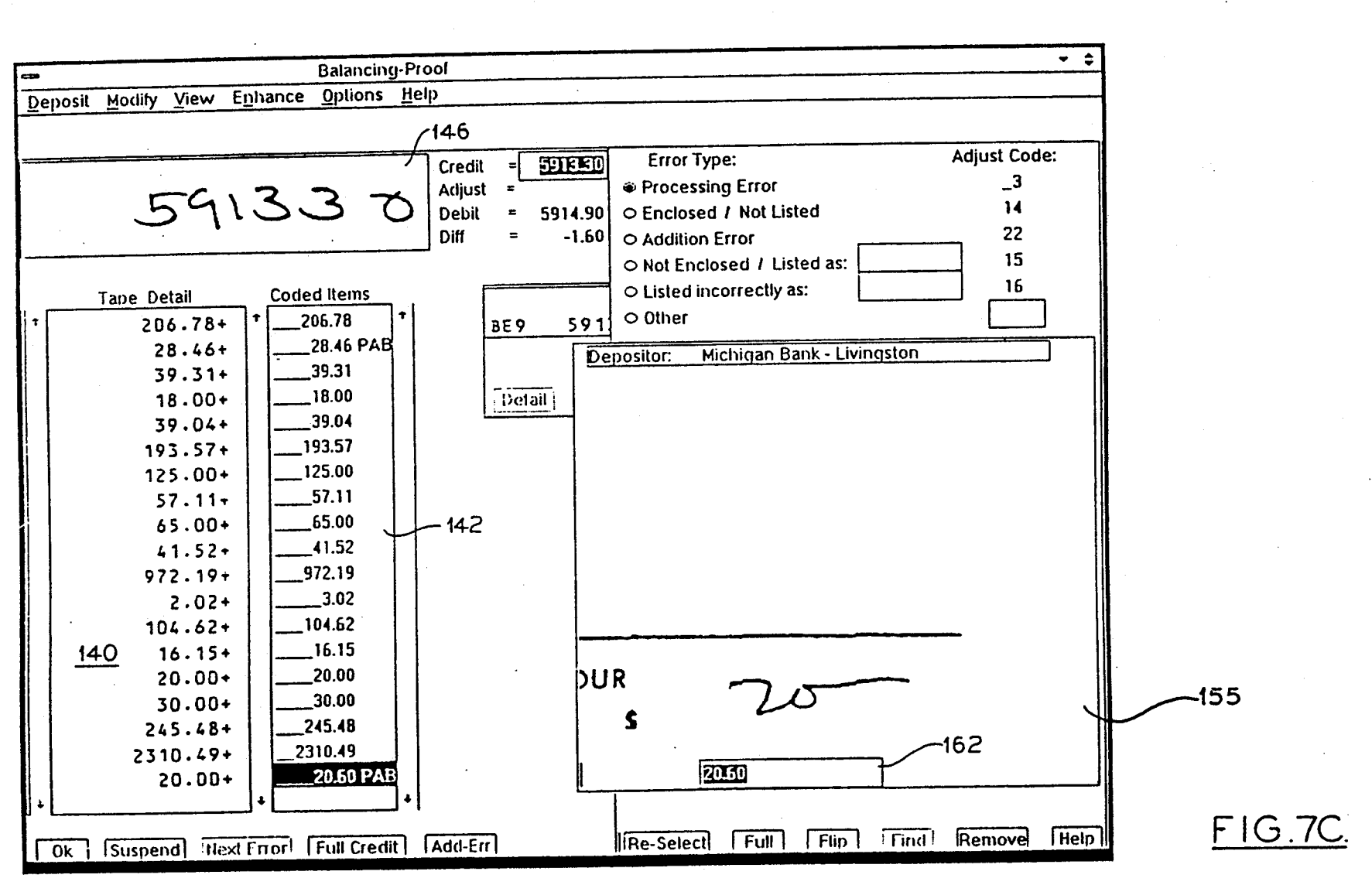
Figure 7D:
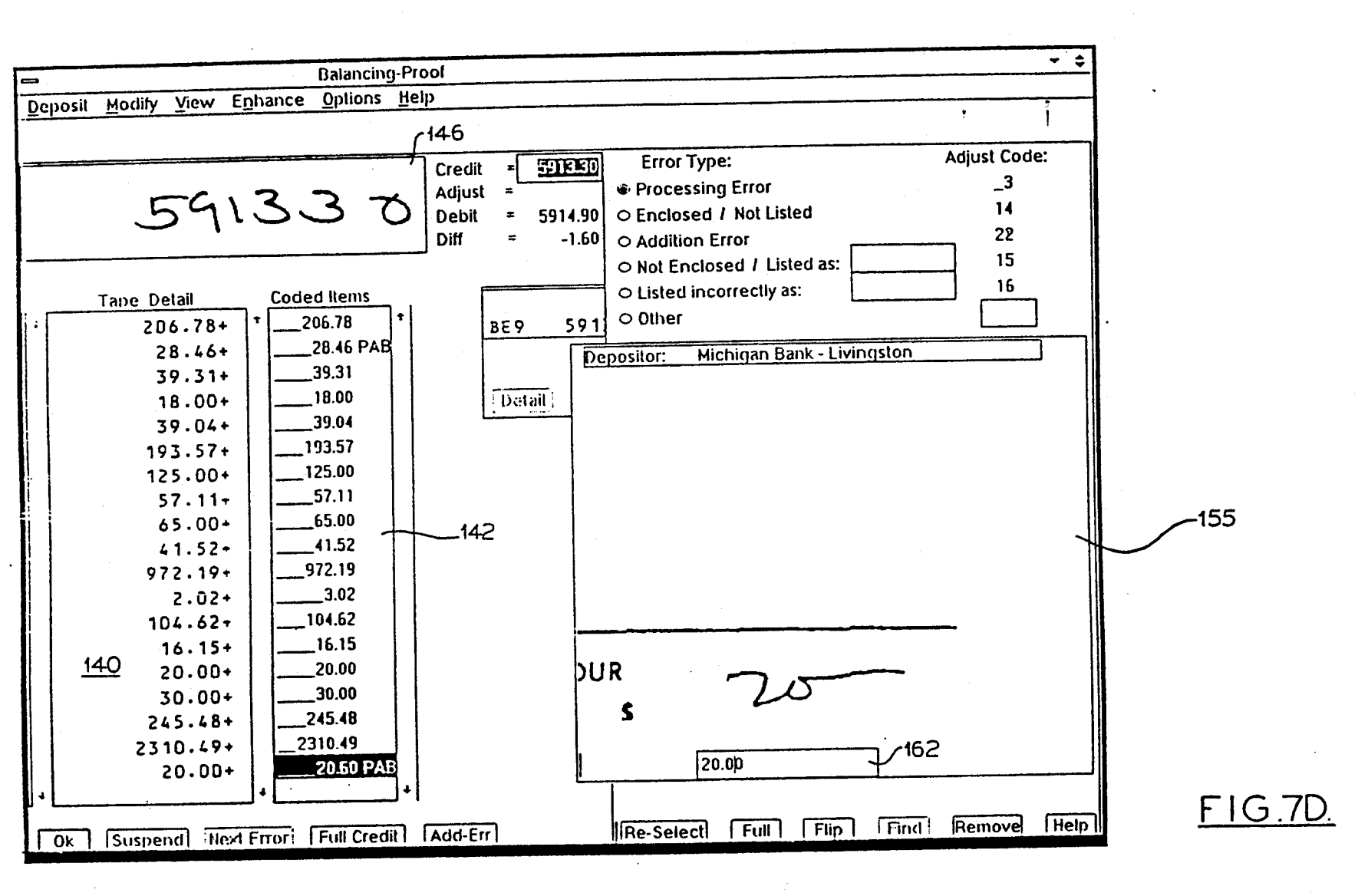

In FIG. 7A the amount $28.46 is highlighted or flagged by the symbol "PAB". This is a suspected error identified by the preliminary auto balance function described earlier. The operator may double click on this item to view the check image and thereby verify whether the coded amount was correctly recognized from the corresponding amount printed on the adding machine tape. If the operator concludes that this was not the source of the out-of-balance condition, he can then move to the next screen of items to consider the next error. This can be accomplished by clicking on the center scroll bar 144, or more conveniently by clicking on the option at the bottom of the screen labeled "Next Error". In either event, the next possible error is then presented to the operator. Thus, as shown in FIG. 7B, the highlighted cursor is on the item $20.60 PAB, another potential error identified by the preliminary auto balance function. By clicking on this amount, a window 155 (FIG. 7C) is opened on the display screen to show the image of the convenience amount field from the check. From this display, the operator can readily see that the correct handwritten amount was $20.00 rather than $20.60. Beneath the image window 155 is a keying Window 162 displaying the incorrect amount $20.60. As shown in FIG. 7D, the operator manually keys the correct amount into the keying window 162 and hits enter, whereupon the amount in the coded item window is corrected from $20.60 to $20.00. As shown in FIG. 7E, the corrected $20.00 amount is highlighted or flagged by a correction symbol "C". After entry of the correction, the system recalculates to determine whether the deposit is now in balance. As shown in FIG. 7E, the difference field 150 now shows that the deposit is still out of balance by $1.00.

Thus, the operator continues to compare the tape detail with the coded items to identify a discrepancy. As shown by the highlighted cursor in FIG. 7E, the operator finds a discrepancy between the $2.02 amount appearing on the tape detail, and the corresponding $3.02 amount appearing in the coded item column By clicking on the questioned $3.02 amount, the operator causes the system to open a window 155 in which is displayed the image of the handwritten convenience amount from the check. The keying window 162 beneath the amount image shows $3.02. In this case, the operator sees that the coded item amount of $3.02 correctly corresponds to the actual handwritten amount on the check, and thus concludes that the $2.02 amount as listed on the tape detail is in error.

Figure 7G:
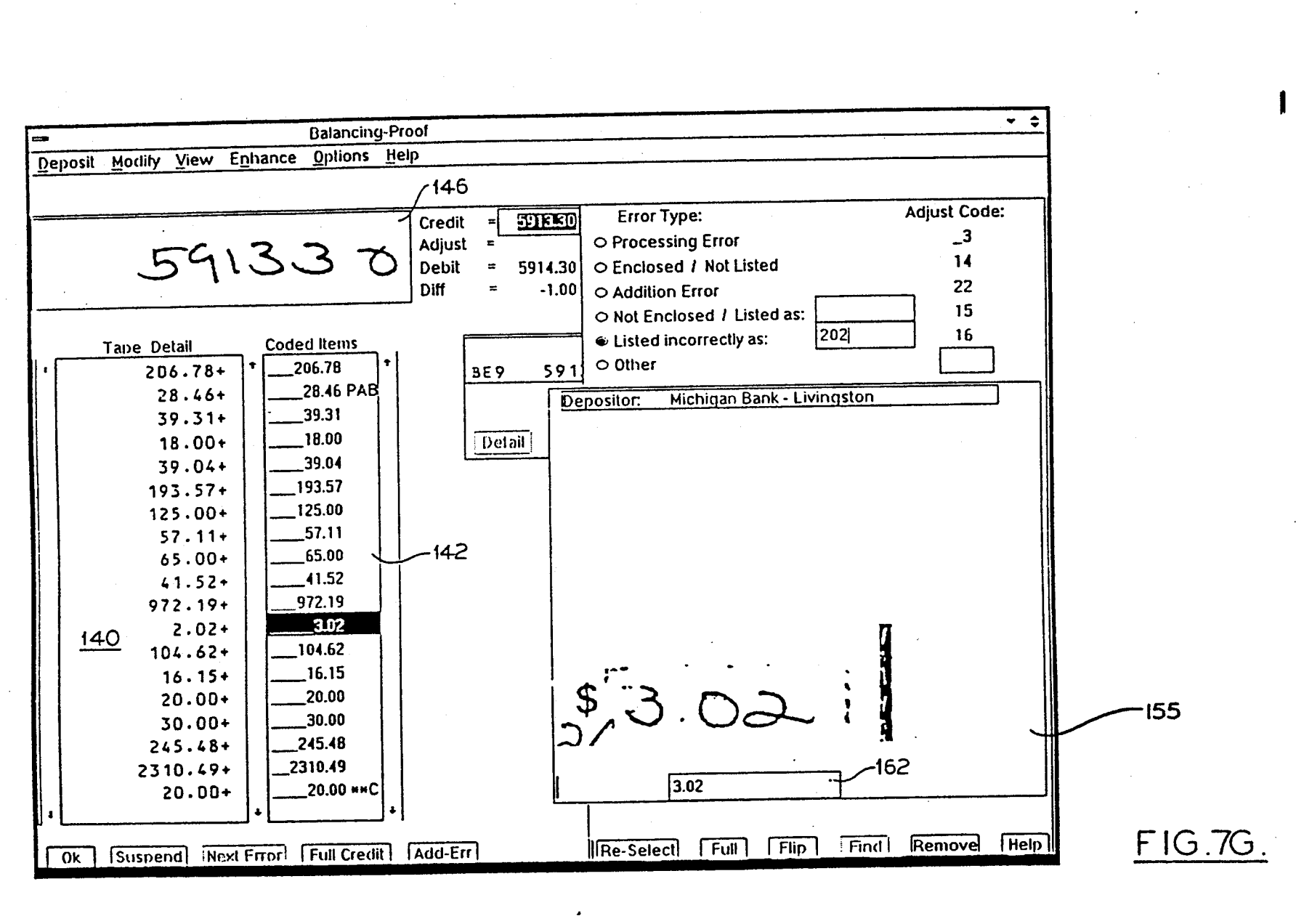

Thus, as shown in FIG. 7G the operator clicks on the error type "Listed incorrectly as:", and keys in the incorrect amount of $2.02 as listed on the deposit slip, Then, as shown in FIG. 7H, the $3.02 coded item amount is flagged by the code "ADJ" to indicate that an adjustment has been made. An adjustment in the amount of $1.00 appears in the adjustment field 149. An adjustment in this amount is made to the depositor account and a depositor advice is produced for sending to the depositor showing the image of the incorrect amount as it appeared on the tape, the image of the actual check, and the reason for and amount of the adjustment.

After entering the adjustment of $1.00, the system recalculates and finds that there is no remaining difference and that the deposit is thus in balance. Processing of this deposit is thus completed.

Example 3

This example also illustrates a relatively large commercial deposit in which the summary document includes both a deposit slip with a handwritten total and an accompanying adding machine tape containing a listing of each item and a machine total. In this instance, the deposit is out of balance by $20.00, as shown in the difference field.

As a result of the preliminary auto balance procedure, the system has located a $20.00 item listed on the adding machine tape for which there is no corresponding check. The preliminary auto balance function has highlighted this to the Examiner by the legend "MISSING" indicating that there is a missing item.

Figure 8B:
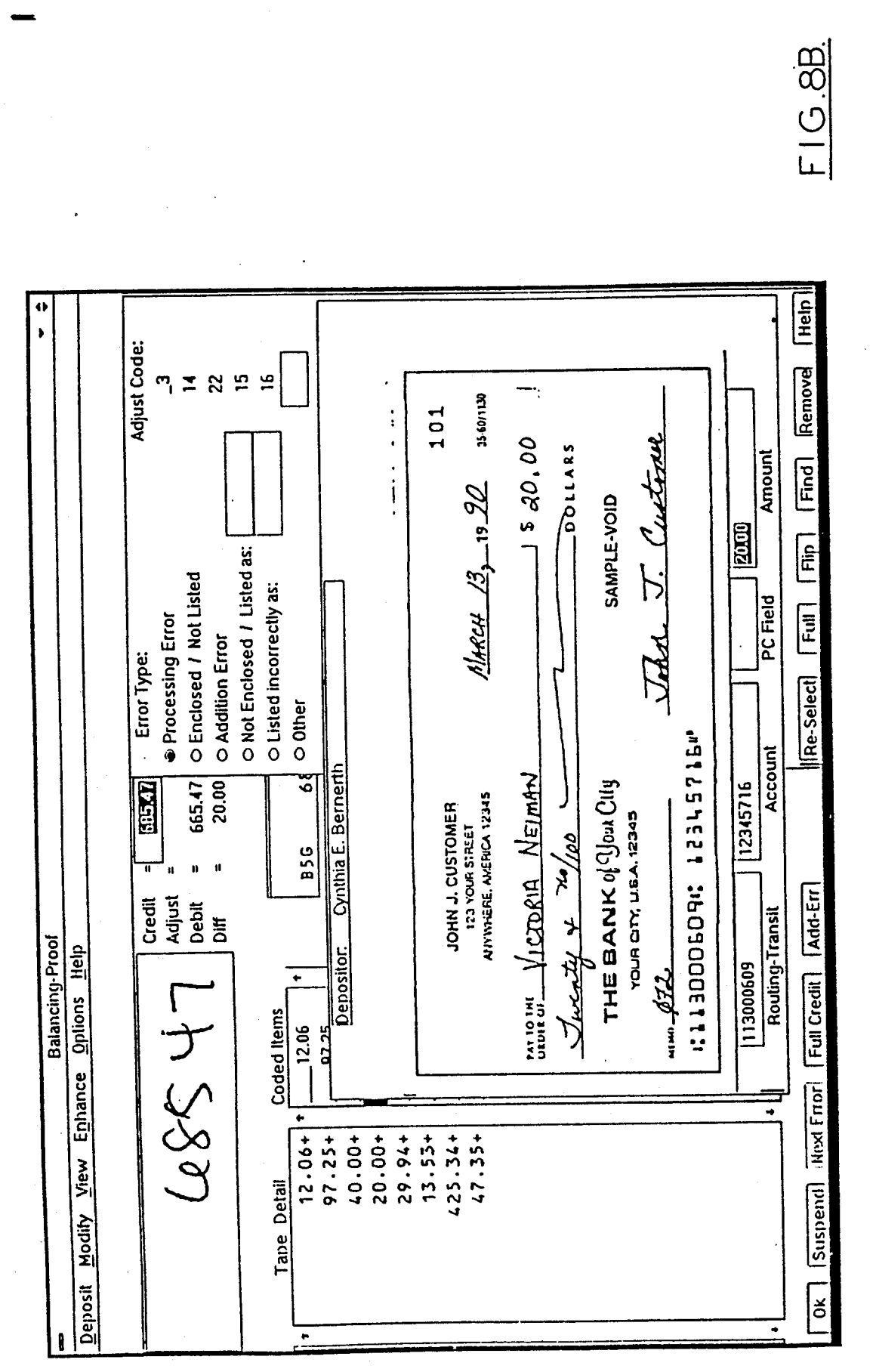
Figure 8C:
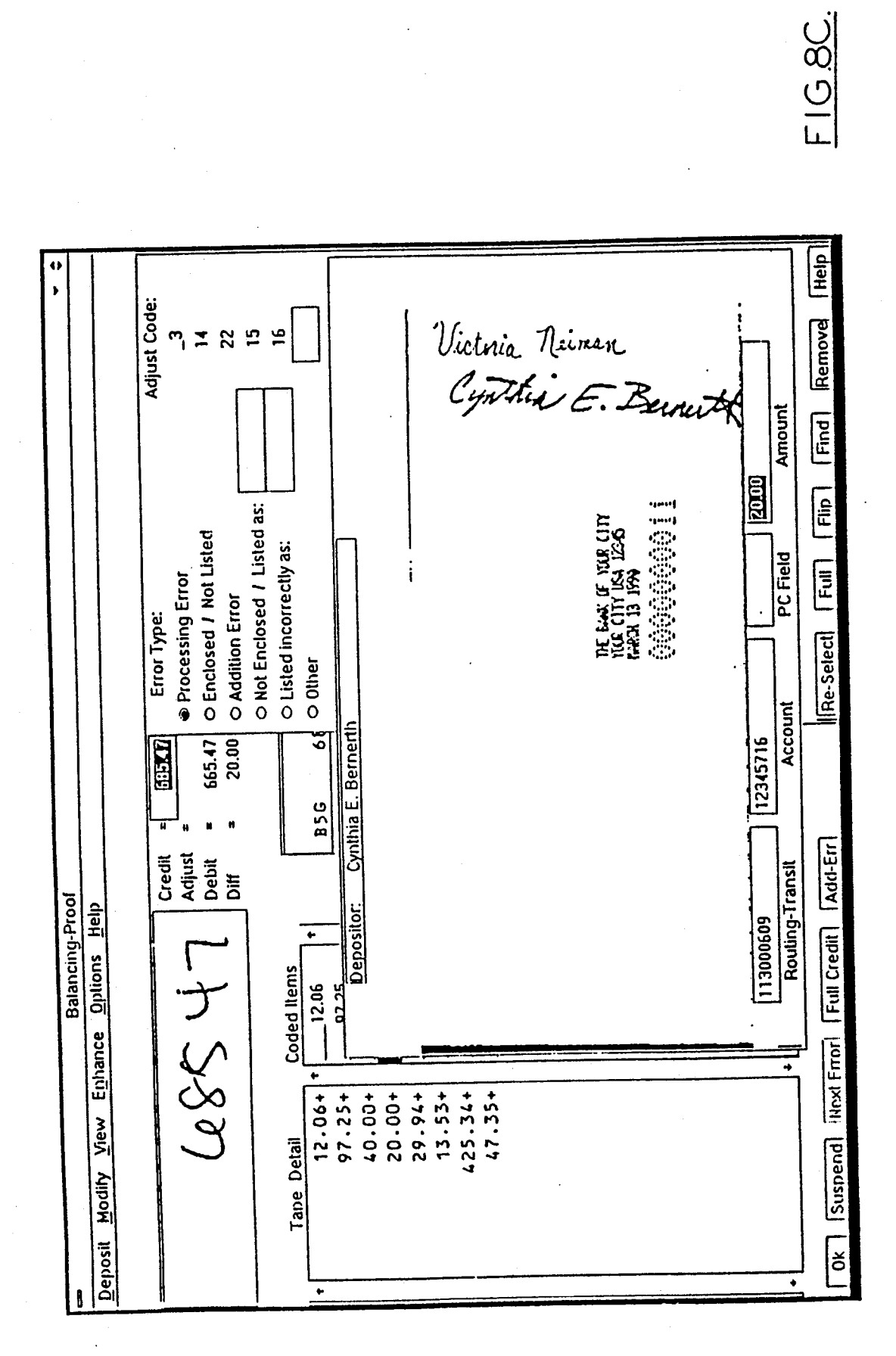

When the operator clicks on this item, the system searches the free item file to locate any misplaced checks which correspond to the $20.00 amount. Upon finding a match, the image of the matching check is displayed on the screen to the operator in a window, as shown in FIG. 8B. The operator can then inspect the check to determine whether it belongs with the deposit. In this instance, the name of the depositor is displayed for the convenience of the operator, and the operator can compare the name of the payee to that of the depositor. Since it is not evident from the face of the check that this check belongs in the deposit, the operator can view the back of the check by clicking on the option "Flip" at the bottom of the screen. Then, as shown in FIG. 8C the operator sees that the check was endorsed by the depositor Cynthia E. Bernerth, and thus belongs with this deposit. By clicking on the option "Ok", this check will be added to the deposit. Then, as shown in FIG. 8D, a coded amount of $20.00 is added to the coded items with a symbol "C" indicating that a correction has been made. The balance is recalculated and it is determined that the deposit is now in balance. This kind of error typically arises due to a system processing error in which a check may become misplaced or otherwise lost from its corresponding deposit.

Example 4

Figure 9C:
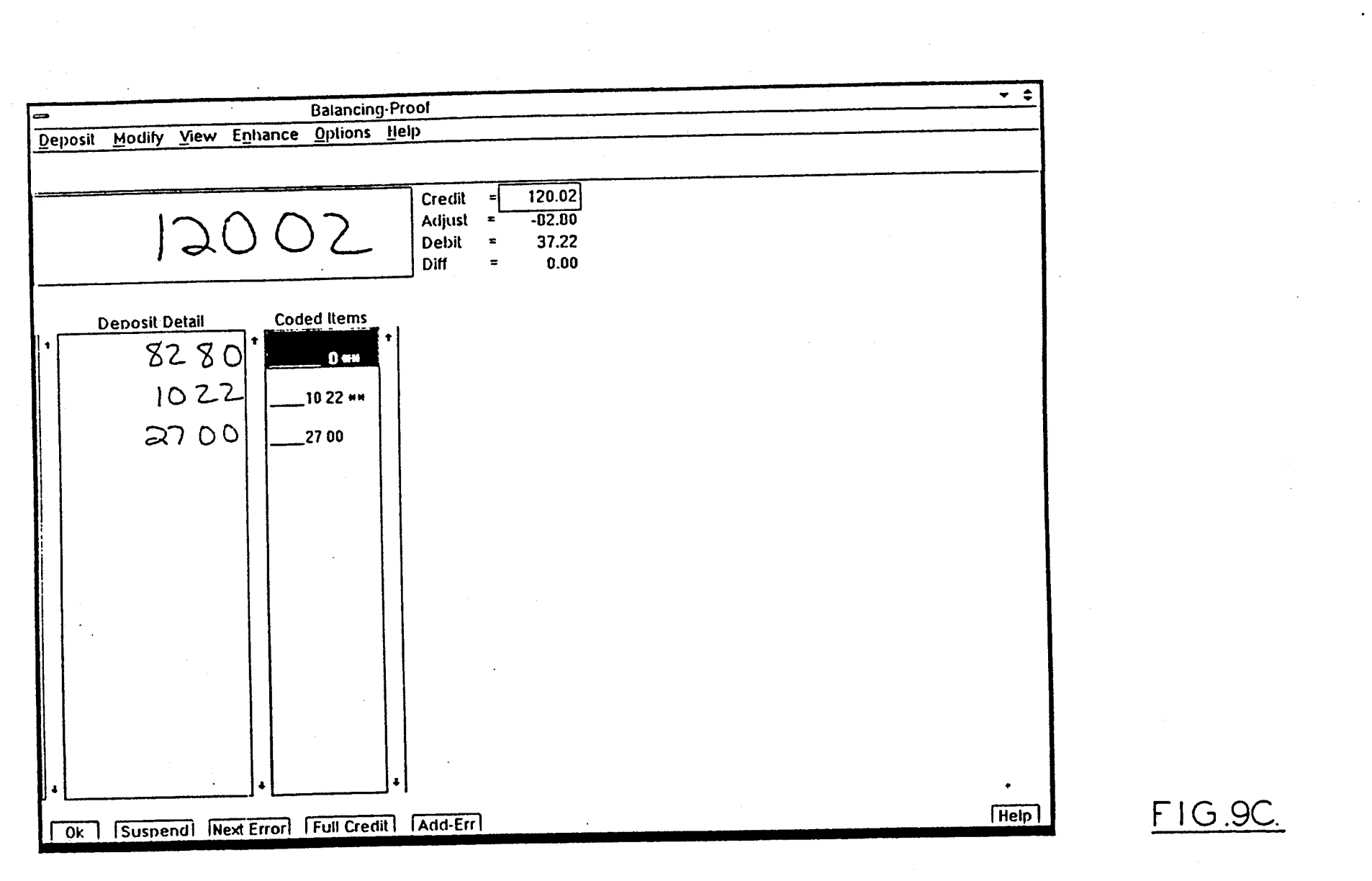

In this example, as in the previous example, the preliminary auto balance feature has identified an item which was listed on the deposit slip but for which no corresponding check was found. The deposit is out of balance by $82.80. The system highlights to the operator by the legend "MISSING" that there is no check corresponding to the $82.80 amount listed on the deposit slip, and the cursor is automatically positioned on this item. When the operator double clicks on this item, a search of the free item file is initiated. In this case, no matching items were found, as is shown in FIG. 9B. Thus, the operator concludes that the discrepancy is a result of the depositor's error in listing the $82.80 item on the deposit slip when no corresponding item was enclosed. The operator clicks on the error type "Not enclosed / Listed as" and keys in the appropriate amount $82.80 Then, as shown in FIG. 9C an adjustment record of $82.80 is generated and charged against the depositor's account. The balance is recalculated and it is determined that the deposit is now in balance.

Example 5

FIGS. 10A to 10D illustrate a large commercial deposit in which the checks are delivered in three bundles, each with an associated adding machine tape which lists each check in the bundle and provides a bundle total, and also including a deposit slip containing the overall total from the three bundles. As in FIG. 7, the display screen includes a tape detail window, a coded item window, a window containing the total line from the deposit slip, and in this instance three windows showing the image of the adding machine tape total for each bundle, together with a separate breakdown on the credit, adjustment, debit and difference for the bundle. At the top of the screen, the difference field shows that the deposit is out of balance by $34.90. The three separate adding machine tape displays show that the first bundle is out of balance, and that the two remaining bundles are in balance.

In comparing the tape 1 detail with the corresponding coding items, it will be seen that in the lower portion of the display the transaction amounts are correctly aligned with the corresponding coded data amounts in the second display. However, in the upper portion of the screen the amounts are out of register by one row. This condition can be corrected by the operator if desired, by independently scrolling one of the displays relative to the other. For example, the operator could click on the right hand scroll arrow to move this display down one row at a time in order to position the numbers in alignment.

In FIG. 10A it is seen that the coded data amount of $34.97 has been highlighted or flagged by the preliminary auto balance step with the symbol "PAB", and that there is no corresponding transaction listed on the adding machine tape.

Figure 10B:
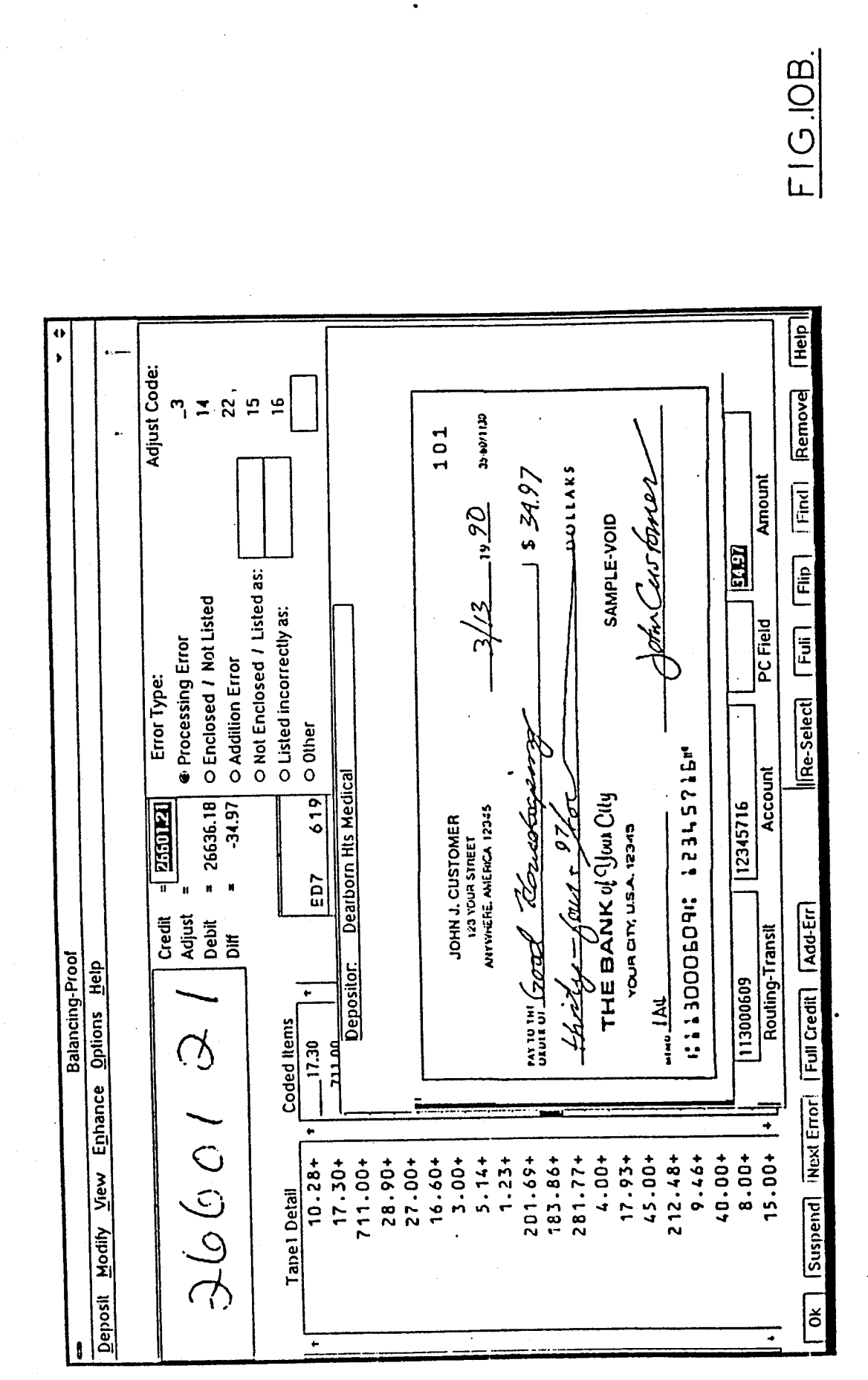
Figure 10C:
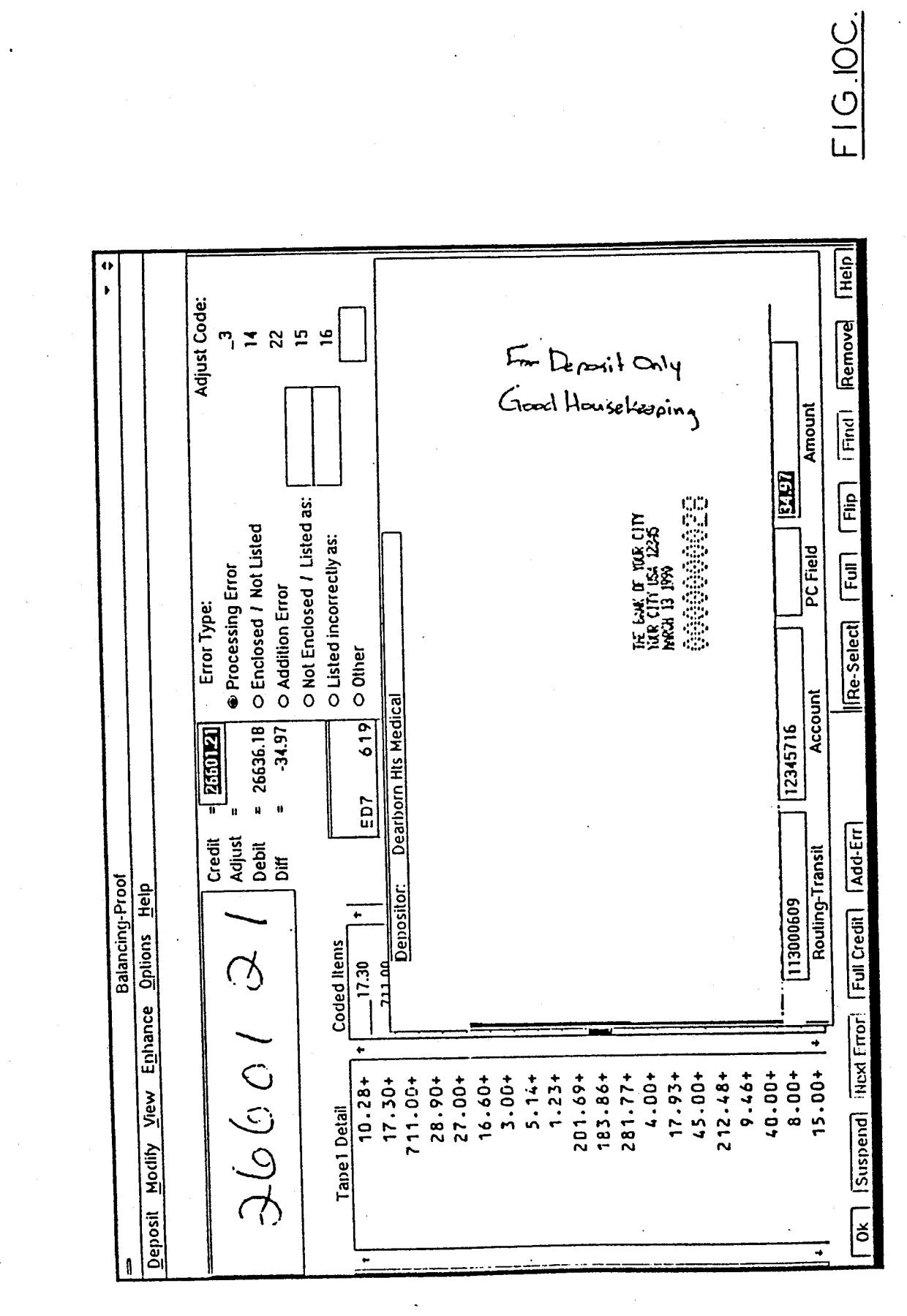

When the operator clicks on the highlighted $34.97 amount, a window is opened and the image of the corresponding check is displayed, as seen in FIG. 10B. The operator can examine the face of the check to determine whether it belongs with the deposit, and by clicking on the option "Flip" the operator can also see the reverse side of the check as shown in FIG. 10C. By inspecting the name of the payee and the endorsement on the check, the operator concludes that this check does not belong with the deposit. Presumably, this check was misplaced from another deposit. The operator clicks on the option "Remove" and this check is removed from the deposit and placed in the free item file so that it can be matched up with its correct deposit as described elsewhere herein.

After removal of the check, the coded item is deleted from the display and the totals are recalculated to determine whether the deposit is now in balance. As shown in FIG. 10, all bundles are now in balance, and processing of this deposit is thus completed.

In the drawings and specification there have been disclosed exemplary embodiments of the invention and, although specific terms are employed, they are used in a generic and descriptive sense only and not for purposes of limitation, the scope of the invention being set forth in the following claims.

That which is claimed is:

1. A method of processing documents in groups which include a summary document, such as a customer deposit slip, and a plurality of associated transaction documents, such as checks, with each transaction document having an amount recorded thereon from which a coded data amount is derived, and with the summary document containing a listing of the respective transaction amounts, said method comprising the steps of:
generating on a display screen a first display containing images of the respective transaction amounts listed on a summary document;
also generating on the display screen a second display containing coded data amounts with each individual transaction document so that an operator may compare the transaction amount images in said first display to the corresponding transaction coded data amounts in said second display to identify a discrepancy;
responding to an operator indication of an identified discrepancy;
identifying and indicating a nonmatching pair of transactions in the first and second displays; and
generating on the display screen a third display containing an image of the amount field from the transaction document to thereby permit an operator to compare the transaction amount as recorded on the original transaction document with the transaction amount as listed on the summary document and with the coded data amount associated with the transaction.

2. A method according to claim 1 wherein the step of responding to an operator indication of an identified discrepancy includes correcting an identified discrepancy.

3. A method according to claim 2 wherein the step of correcting an identified discrepancy comprises generating an adjustment record to correct a depositor error.

4. A method according to claim 2 wherein the step of correcting an identified discrepancy comprises correcting the coded data amount to correct a keying or recognition error.

5. A method according to claim 1 wherein said step of generating a second display includes the step of arranging the coded data amounts in the second display in a similar sequence as the corresponding transaction amount images appear in said first display to facilitate identifying matching pairs of amounts and locating any discrepancy.

6. A method according to claim 1 wherein said step of generating a second display includes arranging the coded data amounts in the second display in a similar line spacing as the corresponding transaction amount images appear in said first display to facilitate identifying matching pairs of amounts and locating any discrepancy.

7. A method according to claim 6 wherein said step of arranging the coded data amounts in the second display in a similar line spacing as the corresponding transaction amount images appear comprises aligning each coded data amount side-by-side on a common horizontal line with its corresponding transaction amount image in said first display.

8. A method according to claim 1 wherein said steps of generating first and second displays include forming the displays as two side-by-side columns, each containing rows of amounts, with the rows of said first column containing the images of amounts corresponding to individual transactions listed on the summary document, and with the rows of said second column containing coded data amounts for the respective transaction documents, and wherein said step of generating a second display includes displaying the coded data amounts in the second display in a similar sequence as the corresponding transaction amount images appear in said first display so that matching pairs of amounts are located in side-by-side relationship on the same row of adjacent columns to facilitate locating a discrepancy in the amounts.

9. A method according to claim 1 wherein said steps of generating first and second displays include forming the displays as two side-by-side columns, each containing rows of amounts, with the rows of said first column containing the images of amounts corresponding to individual transactions listed on the summary document, and with the rows of said second column containing coded data amounts for the respective transaction documents, and including the step of adjusting the line spacing so that the coded data amounts in the second display have a similar line spacing to the corresponding transaction amount images in said first display and corresponding pairs of amounts are located in side-by-side relationship on the same row of adjacent columns to facilitate locating an discrepancy in the amounts.

10. A method according to claim 1 wherein the coded data amounts associated with the respective transaction documents are derived by optical character recognition of the transaction amounts as recorded on the transaction documents, and wherein said method includes the further steps of identifying suspected recognition errors and displaying a visual indicator in association with any coded data amounts in the second display which are identified as suspected recognition errors to thereby facilitate locating a discrepancy.

11. A method according to claim 1 including the further step of identifying whether the source of discrepancy is resulting from a system error or a depositor error.

12. A method according to claim 1 including the further step of generating an adjustment record if the source of the discrepancy is determined to be an error in the amounts listed on the summary document.

13. A method according to claim 1 including the additional steps of comparing the coded data amount as displayed in said second display with the image of the transaction amount as displayed in said third display and generating a correction for the coded data amount if the coded data amount does not agree with the image of the transaction amount as displayed in said third display.

14. A method of processing documents in groups which include a summary document, such as a customer deposit slip, and a plurality of associated transaction documents, such as checks, with each transaction document having an amount recorded thereon from which a coded data amount for the transaction document is derived, and with the summary document containing a listing of the respective transaction amounts and a group total, with at least the group total being processed by optical character recognition and/or manual keying to generate a coded data amount corresponding to the group total, said method comprising the steps of:

scanning the summary document and each associated transaction document and capturing images of the respective documents;

generated a coded data amount corresponding to the amount recorded on each transaction document;

generating on a display screen a first display containing images of the respective transaction amounts listed on a summary document;

also generating on the display screen a second display containing coded data amounts associated with each individual transaction document so that an operator may compare the transaction amount images in said first display to the corresponding transaction coded data amounts in said second display to identify a discrepancy; and in response to an operator indication of an identified discrepancy, generating on the display screen a third display containing an image of the amount field from the transaction document of an identified discrepancy so that an operator may compare the transaction amount as recorded on the original transaction document with the transaction amount as listed on the summary document and with the coded data amount associated with the transaction to identify the source of the discrepancy.

15. A method according to claim 14 including the step, performed if the image of the amount as recorded on the original transaction document is not legible, of generating in said third display the full image of the transaction document so that an operator can read the entire document.

16. A method according to claim 14 including the step, performed if the amount as recorded on the original transaction document matches the coded data amount, of generating an adjustment record indicating that the amount was incorrectly listed on the summary document.

17. A method according to claim 14 including the step, performed if the amount as recorded on the original transaction document does not match the coded data amount, of correcting the coded data amount to match the amount on the transaction document.

18. A system for processing documents in groups which include a summary document, such as a customer deposit slip, and plurality of associated transaction documents, such as checks, with each transaction document having an amount recorded thereon from which a coded data amount is derived, and with the summary document containing a listing of the respective transaction amounts, said system comprising:
- a display screen;
- means for generating on said display screen a first display containing images of the respective transaction amounts listed on a summary document; and
- means for also generating on the display screen in proximity to said first display a second display containing coded data amounts associated with each individual transaction document so that an operator may compare the transaction amount images in said first display to the corresponding transaction coded data amounts in said second display to identify a discrepancy;
- means for receiving an operator indication of a nonmatching pair of transactions in the first and second displays; and
- means responsive thereto for generating on the display screen a third display containing the image of the amount field from the transaction document to thereby permit the operator to compare the transaction amount as recorded on the original transaction document with the transaction amount as listed on the summary document and with the coded data amount associated with the transaction.

19. A system according to claim 18 additionally including means actuable by an operator for indicating an identified discrepancy.

20. A system according to claim 19 including means responsive to an operator indication of an identified discrepancy for correcting the identified discrepancy.

21. A system according to claim 20 wherein said means for correcting an identified discrepancy comprises means for generating an adjustment record to correct a depositor error.

22. A system according to claim 20 wherein said means for correcting an identified discrepancy comprises means for correcting the coded data amount to correct a keying or recognition error.

23. A system according to claim 18 wherein said means for generating a second display includes means for arranging the coded data amounts in the second display in a similar sequence as the corresponding transaction amount images appear in said first display to facilitate identifying matching pairs of amounts and locating a discrepancy.

24. A system according to claim 18 wherein said means for generating a second display includes means for arranging the coded data amounts in the second display in a similar line spacing as the corresponding transaction amount images appear in said first display to facilitate identifying matching pairs of amounts and locating a discrepancy.

25. A system according to claim 18 additionally including means associated with said first and second displays and actuable by an operator for scrolling the respective displays to position the image of an individual transaction amount in said first display adjacent the corresponding coded data amount in said second display to thereby facilitate locating nonmatching pairs of transactions.

26. A system according to claim 25 wherein said means generating first and second displays include means for forming the displays as two side-by-side columns, each containing rows of amounts, with the rows of said first column containing the images of amounts corresponding to individual transactions listed on the summary document, and with the rows of said second column containing coded data amounts for the respective transaction documents, and wherein said means for scrolling comprises means for vertically displacing the rows in one of said columns relative to the rows in the other of said columns to position the image of an individual transaction amount in said first display in side-by-side relationship to the corresponding coded data amount in said second display.

27. A system according to claim 18 additionally including optical character recognition means for processing the respective transaction documents and generating coded data amounts from the transaction amounts as recorded on the transaction documents, said optical character recognition means including error recognition means for identifying suspected recognition errors, and including means responsive to the identification of a suspected recognition error for displaying a visual indicator in association with any coded data amounts in the second display which are identified as suspected recognition errors to thereby facilitate locating a discrepancy.

28. A system according to claim 18 including means operable if the number of transaction amount images in said first display is less than the number of coded amounts, for receiving an indication by an operator of a coded amount in said second display which does not have a corresponding image amount in said first display and for displaying the full image of the indicated document so that the operator can verify if it belongs in the group.

29. A system according to claim 28 including means responsive to an indication by the operator that the document belongs in the group for generating an adjustment record indicating an enclosed but not listed error.

30. A system according to claim 28 including means responsive to an indication by the operator that the document does not belong in the group for deleting the document from the group and storing it in a free item file.

31. A system for processing documents in groups which include a summary document, such as a customer deposit slip, and plurality of associated transaction documents, such as checks, with each transaction document having an amount recorded thereon from which a coded data amount is derived, and with the summary document containing a listing of the respective transaction amounts, said system comprising;
- a display screen;
- means for generating on said display screen a first display containing images of the respective transaction amounts listed on a summary document; and
- means for also generating on the display screen in proximity to said first display a second display containing coded data amounts associated with each individual transaction document so that an operator may compare the transaction amount images in said first display to the corresponding transaction coded data amounts in said second display to identify a discrepancy;
- means for receiving an operator indication of an amount image in said first display which does not have a corresponding coded amount in said first display; and
- means responsive thereto for searching as free item file containing data on misplaced transaction documents to locate transaction documents with a matching coded data amount.

32. A system according to claim 31 including means responsive to locating in the free item file a transaction document with a matching coded data amount for generating a third display containing the full image of the matching transaction document from the free item file so that an operator can identify whether the document belongs in the group.

33. A system according to claim 31 including means responsive to the failure to locate a transaction document in the free item file with a matching coded data amount for generating an adjustment record indicating a listed but not enclosed error.

34. A system for processing documents in groups which include a summary document, such as a customer deposit slip, and a plurality of associated transaction documents, such as checks, with each transaction document having an amount recorded thereon from which a coded data amount is derived, and with the summary document containing a listing of the respective transaction amounts, said system comprising:
  means for scanning the summary document and each associated transaction document and for capturing images of the respective documents;
  means for generating a coded data amount corresponding to the amount recorded on each transaction document;
  a display screen;
  means for generating on said display screen a first display containing images of the respective transaction amounts listed on a summary document;
  means for also generating on the display screen in proximity to said first display a second display containing coded data amounts associated with each individual transaction document so that an operator may compare the transaction amount images in said first display to the corresponding transaction coded data amounts in said second display to identify a discrepancy; and
  means for generating on the display screen a third display containing an image of the amount field from the transaction document of an identified discrepancy to enable an operator to compare the transaction amount as recorded on the original transaction document with the transaction amount as listed on the summary document and with the coded data amount associated with the transaction to identify the source of the discrepancy.

35. A system according to claim 34 including means actuable by an operator if the image of the amount as recorded on the original transaction document is not legible, for generating in said third display the full image of the transaction document so that the operator can read the entire document.

36. A system according to claim 34 including means actuable by an operator if the amount as recorded on the original transaction document matches the coded data amount, for generating an adjustment record indicating that the amount was incorrectly listed on the summary document.

37. A system according to claim 34 including means actuable by an operator if the amount as recorded on the original transaction document does not match the coded data amount, for correcting the coded data amount to match the amount on the transaction document.

* * * * *